(12) United States Patent
Lou et al.

(10) Patent No.: US 11,737,085 B2
(45) Date of Patent: Aug. 22, 2023

(54) DATA TRANSMISSION METHOD AND APPARATUS, AND SYSTEM

(71) Applicant: Huawei Technologies Co., Ltd., Shenzhen (CN)

(72) Inventors: Chong Lou, Shanghai (CN); Xing Liu, Shenzhen (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 17/039,411

(22) Filed: Sep. 30, 2020

(65) Prior Publication Data

US 2021/0029730 A1 Jan. 28, 2021

Related U.S. Application Data

(63) Continuation of application No. PCT/CN2019/081247, filed on Apr. 3, 2019.

(30) Foreign Application Priority Data

Apr. 3, 2018 (CN) .......................... 201810288325.2

(51) Int. Cl.
*H04W 72/1268* (2023.01)
*H04L 1/1812* (2023.01)
*H04W 72/23* (2023.01)

(52) U.S. Cl.
CPC ....... *H04W 72/1268* (2013.01); *H04L 1/1812* (2013.01); *H04W 72/23* (2023.01)

(58) Field of Classification Search
None
See application file for complete search history.

(56) References Cited

U.S. PATENT DOCUMENTS

2009/0168731 A1 7/2009 Zhang et al.
2010/0322165 A1* 12/2010 Yoo ........................ H04L 1/0073
370/329

(Continued)

FOREIGN PATENT DOCUMENTS

| CN | 102170337 A | 8/2011 |
| CN | 104579601 A | 4/2015 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.1.0, total 109 pages, 3rd Generation Partnership Project, Valbonne, France (Mar. 2018).

(Continued)

*Primary Examiner* — Ajit Patel
*Assistant Examiner* — Liem H. Nguyen
(74) *Attorney, Agent, or Firm* — Leydig, Voit & Mayer, Ltd.

(57) ABSTRACT

This application provides a data transmission method and apparatus, and a system, to reduce outdated information sent by a terminal to a network device, thereby reducing improper scheduling decisions made by the network device. The method includes: sending a first data packet to a network device, and storing the first data packet; receiving a first uplink grant from the network device, and skipping using the first uplink grant to perform uplink transmission; receiving a second uplink grant from the network device, where the second uplink grant is a grant for retransmission and generated due to a failure of transmission on the first uplink grant; and ignoring the second uplink grant, or transmitting a second data packet to the network device based on the second uplink grant.

16 Claims, 13 Drawing Sheets

(56) References Cited

U.S. PATENT DOCUMENTS

| | | |
|---|---|---|
| 2011/0093757 A1 | 4/2011 | Seol et al. |
| 2013/0051269 A1* | 2/2013 | Suzuki ................. H04L 1/1822 |
| | | 370/252 |
| 2013/0336300 A1* | 12/2013 | Choi ..................... H04J 3/1694 |
| | | 370/336 |
| 2016/0338096 A1 | 11/2016 | Vajapeyam et al. |
| 2017/0135128 A1 | 5/2017 | Yerramalli et al. |
| 2018/0092122 A1 | 3/2018 | Babaei et al. |
| 2018/0220440 A1* | 8/2018 | Dudda .............. H04W 72/1289 |
| 2018/0270026 A1* | 9/2018 | Lee ....................... H04L 1/1864 |
| 2018/0295644 A1* | 10/2018 | Yi ...................... H04W 72/0446 |
| 2019/0159065 A1* | 5/2019 | Kim ...................... H04W 28/06 |
| 2019/0200382 A1* | 6/2019 | Dudda ................. H04L 1/1819 |
| 2019/0245657 A1* | 8/2019 | Lee ....................... H04L 1/1835 |
| 2020/0107301 A1* | 4/2020 | Chen ..................... H04L 1/189 |
| 2020/0119860 A1* | 4/2020 | Shi ........................ H04L 1/1874 |
| 2020/0154400 A1* | 5/2020 | Byun ........................ H04L 5/00 |
| 2020/0295884 A1* | 9/2020 | Bergström .............. H04L 1/189 |
| 2020/0374960 A1* | 11/2020 | Deenoo ............. H04W 72/1284 |

FOREIGN PATENT DOCUMENTS

| | | |
|---|---|---|
| CN | 105122858 A | 12/2015 |
| CN | 105376798 A | 3/2016 |
| CN | 105721950 A | 6/2016 |
| CN | 107370575 A | 11/2017 |
| WO | 2017052170 A1 | 3/2017 |
| WO | 2017052182 A1 | 3/2017 |
| WO | 2017195166 A1 | 11/2017 |
| WO | 2017204734 A1 | 11/2017 |

OTHER PUBLICATIONS

"3rd Generation Partnership Project; Technical Specification Group Radio Access Network; NR; Medium Access Control (MAC) protocol specification (Release 15)," 3GPP TS 38.321 V15.1.0, total 67 pages, 3rd Generation Partnership Project, Valbonne, France (Mar. 2018).

"Changes related to skipping UL transmission," 3GPP TSG-RAN WG2 #101, R2-1803114, Greece, total 3 pages, 3rd Generation Partnership Project, Valbonne, France (Feb. 26-Mar. 2, 2018).

* cited by examiner

DATA TRANSMISSION METHOD AND APPARATUS, AND SYSTEM

CROSS-REFERENCE TO RELATED APPLICATIONS

This application is a continuation of International Application No. PCT/CN2019/081247, filed on Apr. 3, 2019, which claims priority to Chinese Patent Application No. 201810288325.2, filed on Apr. 3, 2018. The disclosures of the aforementioned applications are hereby incorporated by reference in their entireties.

TECHNICAL FIELD

This application relates to the communications field, and more specifically, to a data transmission method and apparatus, and a system.

BACKGROUND

A hybrid automatic repeat request (HARQ) is a technology combining a forward error correction (FEC) method and an automatic repeat request (ARQ) method. The FEC method enables a receive end to correct some errors by adding redundant information, thereby reducing a quantity of retransmissions. For an error that cannot be corrected by the FEC, the receive end requests, according to an ARQ mechanism, a transmit end to retransmit data. The receive end uses an error-detecting code, usually a CRC check, to detect whether a received data packet is incorrect. If the received data packet is correct, the receive end sends an acknowledgment (ACK) to the transmit end. After receiving the ACK, the transmit end sends a next data packet. If the received data packet is incorrect, the receive end discards the data packet, and sends a negative acknowledgment (NACK) to the transmit end. After receiving the NACK, the transmit end resends same data.

In an existing HARQ process, after a terminal sends a data packet for the first time, the terminal stores the data in a corresponding HARQ buffer (HARQ Buffer). If the terminal receives an uplink grant (UL Grant) from a network device at this time for initial transmission, but the terminal cannot decode the UL grant or has no data to be sent. Therefore, the terminal cannot perform initial transmission by using the uplink grant. However, due to impact of interference or noise on the network device, a decoding error occurs in the network device, and the network device incorrectly considers that the terminal has performed the initial transmission. However, because the network device cannot correctly perform decoding, the network device schedules the terminal to perform retransmission. At this time, the terminal still reserves the data sent for the first time. Therefore, the data sent for the first time is sent to the network device.

The data may include some control information, for example, a data size report of a buffer of the terminal, and an uplink power headroom report of the terminal. Therefore, if the terminal retransmits the data packet sent for the first time, the terminal sends outdated information, consequently, affecting scheduling of the network device.

SUMMARY

This application provides a data transmission method and apparatus, and a system, to reduce outdated information sent by a terminal to a network device, thereby improving a proper scheduling decision of the network device.

According to a first aspect, a data transmission method is provided. The method includes:

sending, by a terminal, a first data packet to a network device, and storing the first data packet;

receiving, by the terminal, a first uplink grant from the network device, and skipping using the first uplink grant to perform uplink transmission;

receiving, by the terminal, a second uplink grant from the network device, where the second uplink grant is a grant for retransmission and generated due to a failure of transmission on the first uplink grant; and ignoring, by the terminal, the second uplink grant, or transmitting, by the terminal, a second data packet to the network device based on the second uplink grant.

In some possible implementations, the first uplink grant and the second uplink grant correspond to a same HARQ process.

In some possible implementations, the first uplink grant is a dynamic uplink grant, or the first uplink grant is a preconfigured uplink grant.

In some possible implementations, the second uplink grant is a dynamic uplink grant, or the second uplink grant is a preconfigured uplink grant.

In some possible implementations, the second uplink grant is scrambled with a radio network temporary identifier.

In some possible implementations, the terminal does not send a data packet to the network device on an uplink resource corresponding to the first uplink grant when at least one of the following conditions may be met:

the terminal has no aperiodic channel state information of a physical uplink shared channel to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

Based on the foregoing technical solution, when receiving the grant for retransmission and generated due to the failure of transmission on the first uplink grant, the terminal ignores the uplink grant, or considers the uplink grant used for retransmission as an uplink grant used for initial transmission. Compared with the prior art, the terminal does not send outdated data to the network device. This helps reduce outdated information sent by the terminal to the network device, thereby helping reduce improper scheduling decisions made by the network device.

With reference to the first aspect, in some implementations of the first aspect, the ignoring the second uplink grant, or transmitting a second data packet to the network device based on the second uplink grant includes:

determining, by the terminal, that a hybrid automatic repeat request (HARQ) buffer is empty; and when the HARQ buffer is empty, ignoring, by the terminal, the second uplink grant, or transmitting the second data packet to the network device based on the second uplink grant.

Specifically, after the terminal receives the second uplink grant used for retransmission, if determining that the HARQ buffer is empty, the terminal may ignore the second uplink grant, or the terminal transmits a new data packet to the network device based on the second uplink grant.

According to the data transmission method in an embodiment of this application, a data packet in the HARQ buffer is flushed. This helps reduce outdated information sent by the terminal to the network device, thereby helping reduce improper scheduling decisions made by the network device.

With reference to the first aspect, in some implementations of the first aspect, the method further includes:

starting, by the terminal, a timer when sending the first data packet; and flushing, by the terminal, the HARQ buffer when the timer expires.

In some possible implementations, the terminal flushes the HARQ buffer at a moment that is several moments before or after the timer expires.

In some possible implementations, the several moments are configured by the network device, or the several moments are predefined by a protocol.

In some possible implementations, the terminal flushes the HARQ buffer at a moment before or after the timer expires, and the moment may be configured by the network device or predefined by a protocol.

According to the data transmission method in an embodiment of this application, the timer is started after the data packet is sent, and the HARQ buffer is flushed when the timer expires. This helps reduce outdated information sent by the terminal to the network device, thereby helping reduce improper scheduling decisions made by the network device.

With reference to the first aspect, in some implementations of the first aspect, the method further includes:

flushing, by the terminal, the HARQ buffer when receiving indication information from the network device, where the indication information is used to indicate that the first data packet is successfully received.

In some possible implementations, the method further includes:

starting, by the terminal, a timer when sending the first data packet; and when receiving indication information from the network device, stopping, by the terminal, the timer, and flushing the HARQ buffer, where the indication information is used to indicate that the first data packet is successfully received.

According to the data transmission method in this embodiment of this application, the HARQ buffer is flushed when the indication information indicating that the data packet is successfully received is received. This helps reduce outdated information sent by the terminal to the network device, thereby helping reduce improper scheduling decisions made by the network device.

With reference to the first aspect, in some implementations of the first aspect, the method further includes:

flushing, by the terminal, the HARQ buffer when determining that the first uplink grant is not used to perform uplink transmission.

According to the data transmission method in an embodiment of this application, the terminal flushes the HARQ buffer when determining that the first uplink grant is not used to perform uplink transmission. This helps reduce outdated information sent by the terminal to the network device, thereby helping reduce improper scheduling decisions made by the network device.

With reference to the first aspect, in some implementations of the first aspect, the method further includes:

after receiving the second uplink grant from the network device, determining, by the terminal, that the first uplink grant is not used to perform uplink transmission; and flushing, by the terminal, the HARQ buffer.

According to the data transmission method in an embodiment of this application, the terminal flushes the HARQ buffer when determining, after receiving the second uplink grant used for retransmission, that the first uplink grant is not used to perform uplink transmission. This helps reduce outdated information sent by the terminal to the network device, thereby helping reduce improper scheduling decisions made by the network device.

With reference to the first aspect, in some implementations of the first aspect, before the sending a first data packet to a network device, the method further includes:

receiving, by the terminal, a third uplink grant from the network device, where the third uplink grant is used to transmit the first data packet.

In some possible implementations, the third uplink grant is a dynamic uplink grant, or the third uplink grant is a preconfigured uplink grant.

With reference to the first aspect, in some implementations of the first aspect, the third uplink grant is a preconfigured uplink grant.

With reference to the first aspect, in some implementations of the first aspect, the receiving a third uplink grant from the network device includes:

receiving radio resource control (RRC) signaling from the network device, where the RRC signaling includes the third uplink grant; or receiving radio resource control (RRC) signaling and downlink control information (DCI) from the network device, where the RRC signaling includes configuration information of the third uplink grant, and the DCI includes the third uplink grant.

With reference to the first aspect, in some implementations of the first aspect, the receiving a first uplink grant from the network device includes:

receiving, by the terminal, downlink control information (DCI) from the network device, where the DCI includes the first uplink grant.

With reference to the first aspect, in some implementations of the first aspect, the transmitting a second data packet to the network device based on the second uplink grant includes:

Initially transmitting, by the terminal, the second data packet to the network device based on the second uplink grant.

According to a second aspect, this application provides a data transmission apparatus. The data transmission apparatus has a function of implementing behavior of the terminal in the foregoing method aspect, and includes a corresponding unit or means configured to perform features described in the foregoing method aspect. The features may be implemented by using software, hardware, or a combination of hardware and software.

According to a third aspect, this application provides a data transmission apparatus. The data transmission apparatus includes at least one processor and memory, where the at least one processor is configured to perform the method provided in the first aspect.

According to a fourth aspect, this application provides a data transmission apparatus. The data transmission apparatus includes at least one processor and interface circuit, where the at least one processor is configured to perform the method provided in the first aspect.

According to a fifth aspect, a terminal is provided. The terminal includes the apparatus provided in the second aspect, or the terminal includes the apparatus provided in the third aspect, or the terminal includes the apparatus provided in the fourth aspect.

According to a sixth aspect, this application provides a program. When the program is executed by a processor, the method provided in the first aspect is performed.

According to a seventh aspect, this application provides a program product, for example, a computer-readable storage medium, including the program in the sixth aspect.

DESCRIPTION OF EMBODIMENTS

Figure 1:
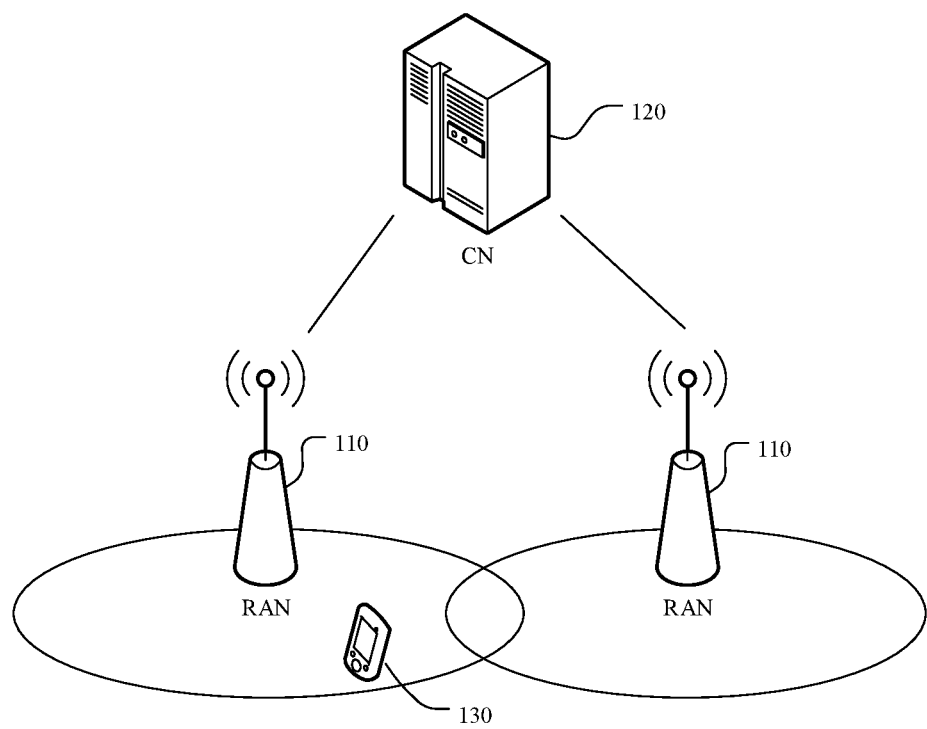
FIG. 1 is a schematic diagram of a communications system according to an embodiment of this application.

A terminal, also referred to as user equipment (UE), a mobile station (MS), a mobile terminal (MT), or the like, is a device that provides a user with voice and/or data connectivity, for example, a handheld device or a vehicle-mounted device having a wireless connection function. Currently, some examples of the terminal include: a mobile phone, a tablet, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, and a wireless terminal in a smart home.

A network device is a device in a wireless network, for example, a radio access network (RAN) node that connects a terminal to the wireless network. Currently, some examples of the RAN node include: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wifi) access point (AP). In a network structure, a network device may include a central unit (CU) node, or a distributed unit (DU) node, or a RAN device including a CU node and a DU node.

A network device in the embodiments of this application may be a device configured to communicate with a terminal. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (Evolutional NodeB, eNB or eNodeB) in an LTE system, or may be a radio controller in a cloud radio access network (CRAN) scenario. Alternatively, the network device may be a relay station, an access point, a vehicle-mounted device, a wearable device, or a network device in a future 5G network, or a network device in a future evolved PLMN network. This is not limited in the embodiments of this application.

Before the embodiments of this application are described, several HARQ-related concepts are first briefly described.

HARQ process: In HARQ, data is sent by using a stop-and-wait protocol. In the stop-and-wait protocol, after sending a transport block (TB), a transmit end stops to wait for feedback information used to perform an acknowledgement, a positive acknowledgement (ACK) or a negative acknowledgement (NACK), on the TB. However, after each transmission, the transmit end stops to wait for the acknowledgement, resulting in a very low throughput. Therefore, in long term evolution (LTE) and new radio NR (New Radio) of a 5G communications system, it is specified that a terminal can use a plurality of parallel HARQ processes: When a HARQ process is waiting for acknowledgment information, the transmit end may continue to send data by using another HARQ process.

HARQ entity: These HARQ processes jointly form an HARQ entity. This HARQ entity combines the stop-and-wait protocol and allows continuous transmission of data. Each terminal has a HARQ entity. However, in carrier aggregation (CA), a terminal may have a respective HARQ entity corresponding to each component carrier. Each HARQ process processes only one TB in a transmission time unit. Each HARQ process has an independent HARQ buffer at a receive end, to perform soft combination on received data. In spatial multiplexing, two TBs are transmitted in parallel in one TTI. In this case, each TB has independent HARQ acknowledgment information, and one HARQ entity includes a set of two HARQ processes.

HARQ process number: A HARQ process number is also referred to as a HARQ process ID, and uniquely indicates a HARQ process.

New data indicator (NDI): Each HARQ process stores an NDI value, and the value uses one bit to indicate whether scheduled data is initially transmitted or retransmitted. If an NDI value of a same HARQ process changes (NDI toggled), it indicates that current transmission is initial transmission of a new TB; or if an NDI value of a same HARO process does not change (NDI not toggled), it indicates that current transmission is retransmission of a same TB.

Redundancy version (RV): A redundancy version is used to indicate a redundancy version used for transmission. A value of the redundancy version ranges from 0 to 3.

Modulation and coding scheme (MCS): In LTE, downlink control information (DCI) uses a 5-bit MCS index (0-31) to indicate a modulation and coding scheme used for current transmission, and the modulation and coding scheme affects selection of a TB size (TBS). There are 32 MCS combinations in total, among which three combinations (indexed 29 to 31) are reserved and are used only for retransmission.

Scheduling process: A network device may schedule, in two manners of dynamic scheduling and preconfigured resource scheduling, a terminal to perform uplink transmission. For example, the network device indicates a dynamic UL grant or a preconfigured UL grant to the terminal for the terminal to send uplink data.

Dynamic scheduling: The network device sends an uplink grant (UL grant). The network device sends control information, that is, a dynamic UL grant, on a physical downlink control channel (PDCCH) that is scrambled by using a terminal identifier. If the terminal successfully decodes the control information, the terminal can obtain a size of a physical layer resource corresponding to this uplink scheduling and time domain/frequency domain distribution of the physical layer resource, and HARQ information required for this uplink scheduling transmission, so that the terminal performs the HARQ process, to complete uplink transmission.

Preconfigured resource scheduling: The network device may alternatively preconfigure, in a semi-static resource allocation manner, a resource required for uplink transmission of the terminal, that is, a preconfigured UL grant. It should be understood that the preconfigured UL grant may periodically occur, and the terminal does not need to obtain an uplink grant before each uplink transmission. For example, the network device may configure, via radio resource control (RRC) signaling, information about a resource for uplink transmission, and further configure a period of the preconfigured UL grant, so that the terminal performs transmission on the preconfigured resource scheduling. This manner may be a configured grant type 1. Alternatively, the network device may configure, via RRC signaling, some information about uplink transmission, for example, a period of the preconfigured UL grant, and sends information about a resource for uplink transmission and activates the resource for uplink transmission via physical layer signaling, so that the terminal performs transmission on the preconfigured resource scheduling. This manner may be a configured grant type 2. The foregoing two manners both may be preconfigured resource scheduling.

It should be noted that, in the embodiments of this application, the "uplink grant" may be understood as signaling used to schedule a physical uplink resource, for example, downlink control information used for an uplink grant, or RRC signaling used for semi-static configuration, or downlink control information used to activate an uplink grant resource in a semi-static configuration manner. The "uplink grant resource" may be understood as a resource indicated by using the uplink grant. In an LTE or NR protocol, each of the "uplink grant" and the "uplink grant resource" may refer to UL grant, and a person skilled in the art may understand the meaning thereof.

It should be further noted that in the embodiments of this application, a "protocol" may be a standard protocol in the communications field. For example, the protocol may include an LTE protocol, an NR protocol, or a related protocol applied to a future communications system. This is not limited in this application.

It should be further noted that, in the embodiments shown below, first, second, and the like are merely intended to facilitate differentiating between different objects, and should not constitute any limitation on this application.

It should be further noted that the term "and/or" describes an association relationship for describing associated objects and represents that three relationships may exist. For example, A and/or B may represent the following three cases: Only A exists, both A and B exist, and only B exists. The character "/" generally represents an "or" relationship between the associated objects. "At least one" means one or more. "At least one of A and B" is similar to "A and/or B", describes an association relationship between associated objects, and represents that three relationships may exist. For example, at least one of A and B may represent the following three cases: Only A exists, both A and B exist, and only B exists.

FIG. 1 is a schematic diagram of a communications system 100 according to an embodiment of this application. As shown in FIG. 1, a terminal 130 accesses a wireless network, to obtain a service of an external network (for example, the Internet) via the wireless network, or communicate with another terminal via the wireless network. The wireless network includes a RAN 110 and a core network (CN) 120, where the RAN 110 is configured to connect the terminal 130 to the wireless network, and the CN 120 is configured to manage the terminal and provide a gateway for communication with the external network.

It should be understood that a data transmission method provided in this application may be applicable to a wireless communications system, for example, the wireless communications system 100 shown in FIG. 1. Two communications apparatuses in the wireless communications system have a wireless communication connection. One communications apparatus of the two communications apparatuses may correspond to the terminal 130 shown in FIG. 1, for example, may be the terminal 130 in FIG. 1, or may be a chip configured in the terminal 130. The other communications apparatus of the two communications apparatuses may correspond to the RAN 110 shown in FIG. 1, for example, may be the RAN 110 in FIG. 1, or may be a chip configured in the RAN 110.

Without loss of generality, the following describes the embodiments of this application in detail by using an example of an interaction process between a terminal and a network device. It may be understood that any terminal in the wireless communications system may communicate, based on the same method, with one or more network devices having a wireless communications connection with the terminal. This is not limited in this application.

Figure 2:
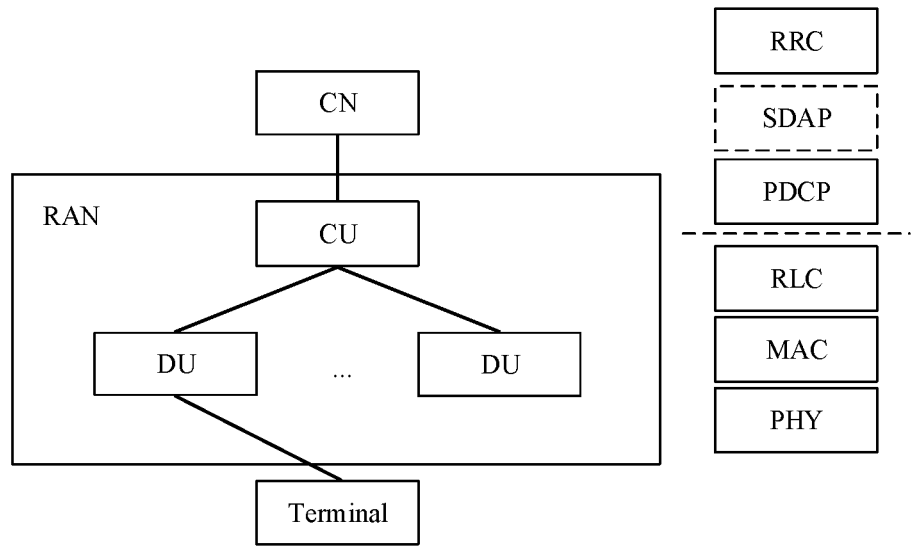
FIG. 2 is a schematic diagram of a network architecture according to an embodiment of this application.

FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented in a node, or may be implemented in a plurality of nodes. The radio frequency apparatus may be independently implemented away from the baseband apparatus, or may be integrated into the baseband apparatus, or a part of the radio frequency apparatus is implemented away from the baseband apparatus and the other part of the radio frequency apparatus is integrated into the baseband apparatus. For example, in a long term evolution (LTE) communications system, a RAN device (eNB) includes a baseband apparatus and a radio frequency apparatus. The radio frequency apparatus may be arranged away from the baseband apparatus. For example, a remote radio unit (RRU) is arranged away from a BBU.

Communication between the RAN device and a terminal complies with a protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as a PDCP layer, an RLC layer, a MAC layer, and a physical layer. In an implementation, a service data adaptation protocol (SDAP) layer may be further included above the PDCP layer.

The functions of these protocol layers may be implemented in one node, or may be implemented in a plurality of nodes. For example, in an evolved structure, the RAN device may include a central unit (CU) and a distributed unit (DU), and a plurality of DUs may be controlled by one CU in a centralized manner. As shown in FIG. 2, the CU and the DU may be divided based on protocol layers of a wireless network. For example, functions of a PDCP layer and protocol layers above the PDCP layer are set on the CU, and functions of protocol layers below the PDCP layer, such as an RLC layer and a MAC layer, are set on the DU.

The RAN device may implement, in one node, the functions of the protocol layers such as a radio resource control (RRC) layer, a packet data convergence protocol (PDCP) layer, a radio link control (RLC) layer, and a media access control (MAC) layer. Alternatively, the RAN device may implement the functions of these layers in a plurality of nodes. For example, in an evolved structure, the RAN device may include a central unit (CU) and a distributed unit (DU), and a plurality of DUs may be controlled by one CU in a centralized manner. As shown in FIG. 2, the CU and the DU may be divided based on protocol layers of a wireless network. For example, functions of a PDCP layer and protocol layers above the PDCP layer are set on the CU, and functions of protocol layers below the PDCP layer, such as an RLC layer and a MAC layer, are set on the DU.

The division of the protocol layers is merely an example, and division may alternatively be performed at another protocol layer. For example, division is performed at the RLC layer. Functions of the RLC layer and a protocol layer above the RLC layer are set on the CU, and a function of a protocol layer below the RLC layer is set on the DU. Alternatively, division is performed within a protocol layer. For example, some functions of the RLC layer and a function of a protocol layer above the RLC layer are set on the CU, and remaining functions of the RLC layer and a function of a protocol layer below the RLC layer are set on the DU. In addition, division may be alternatively performed in another manner, for example, based on a latency. A function whose processing time needs to meet a latency requirement is set on the DU, and a function whose processing time does not need to meet the latency requirement is set on the CU.

In addition, the radio frequency apparatus may not be arranged in the DU and is arranged away from the DU, or may be integrated into the DU, or a part of the radio frequency apparatus is arranged away from the DU, and the other part of the radio frequency apparatus is integrated into the DU. This is not limited herein.

Figure 3:
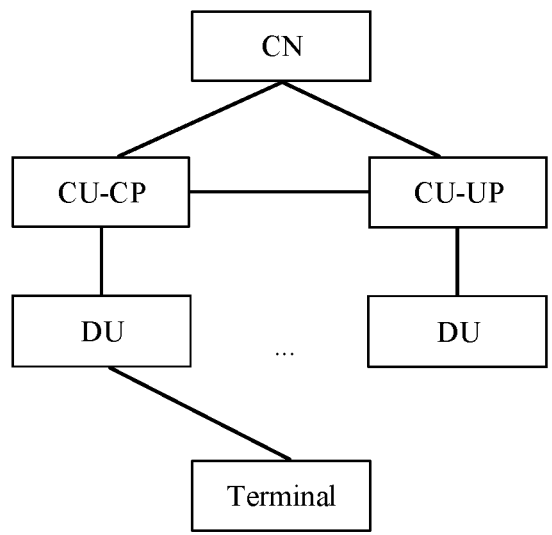
FIG. 3 is a schematic diagram of another network architecture according to an embodiment of this application.

FIG. 3 is a schematic diagram of another network architecture according to an embodiment of this application. Compared with the architecture shown in FIG. 2, a control plane (CP) and a user plane (UP) of a CU may be separated and implemented in different entities: a control plane CU entity (CU-CP entity) and a user plane CU entity (CU-UP entity).

In the foregoing network architecture, signaling generated by the CU may be sent to a terminal via a DU, or signaling generated by the terminal may be sent to the CU via the DU. The DU may not parse the signaling, but directly encapsulates the signaling at a protocol layer and transparently transmits the signaling to the terminal or the CU. In the following embodiments, if signaling transmitted between the DU and the terminal is described, the signaling sent or received by the DU can be such signaling in the foregoing scenario. For example, signaling of an RRC layer or a PDCP layer is finally processed as signaling of a PHY layer and sent to the terminal, or signaling of an RRC layer or a PDCP layer is converted from received signaling of a PHY layer. In this architecture, the signaling of the RRC layer or the PDCP layer may also be considered as being sent by the DU or sent by the DU and a radio frequency apparatus.

In the foregoing embodiment, the CU is classified into a network device on a RAN side. In addition, the CU may be alternatively classified into a network device on a CN side. This is not limited herein.

An apparatus in the following embodiments of this application may be located in a terminal based on a function implemented by the apparatus. When the foregoing CU-DU structure is used, the network device may be a CU node, or a DU node, or a RAN device including a CU node and a DU node.

Figure 4:
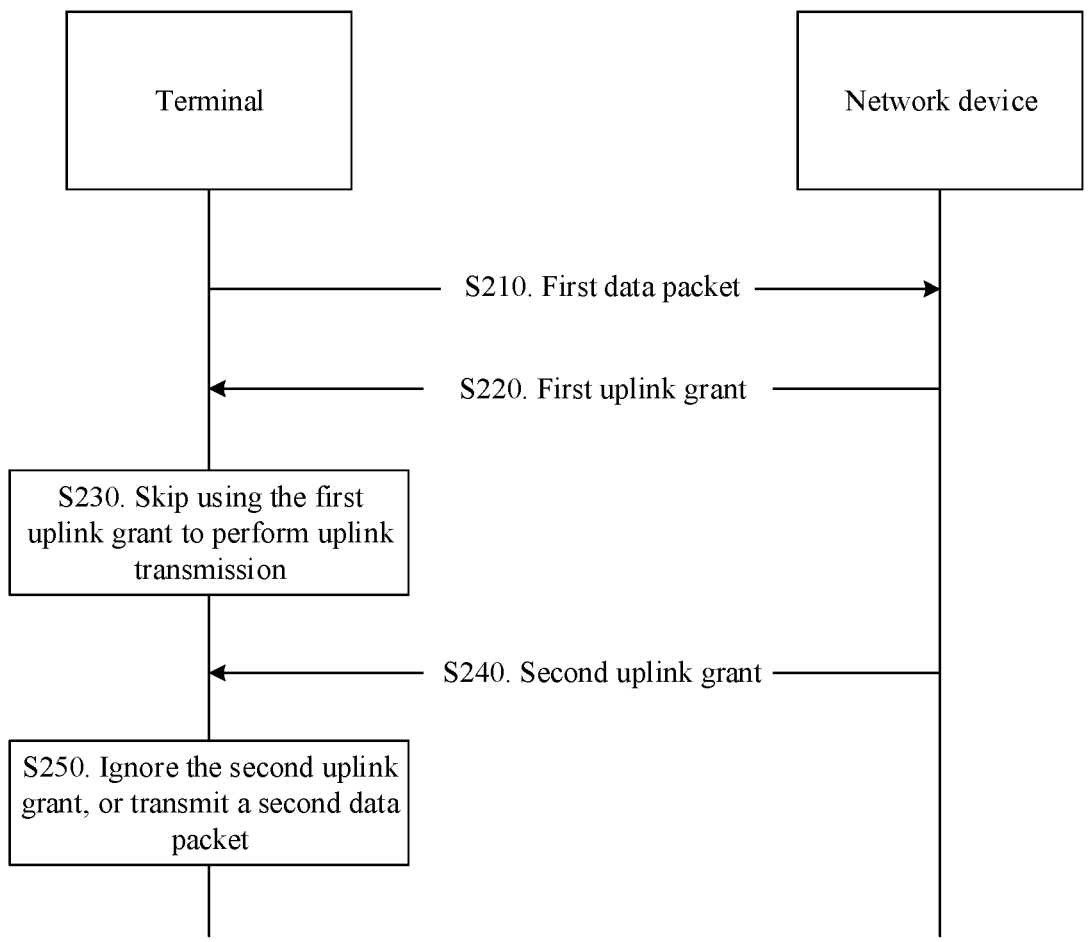
FIG. 4 is a schematic flowchart of a data transmission method according to an embodiment of this application.

FIG. 4 is a schematic flowchart of a data transmission method 200 according to an embodiment of this application. As shown in FIG. 4, the method 200 may be performed by a data transmission apparatus (for example, a terminal, or a chip or an apparatus applied to a terminal). The method 200 includes the following steps.

S210: Send a first data packet to a network device, and store the first data packet.

S220: Receive a first uplink grant from the network device.

S230: Skip using the first uplink grant to perform uplink transmission.

S240: Receive a second uplink grant from the network device, where the second uplink grant is a grant for retransmission and generated due to a failure of transmission on the first uplink grant.

S250: Ignore the second uplink grant, or transmit a second data packet to the network device based on the second uplink grant.

Optionally, the second uplink grant is scrambled by a specific radio network temporary identifier (RNTI), and is indicated to the terminal for retransmission. For example, the radio network temporary identifier is a cell RNTI (C-RNTI), or a configured scheduling RNTI (CS-RNTI) used for preconfigured scheduling retransmission.

Specifically, the terminal sends the first data packet to the network device, and stores the first data packet. The terminal receives the first uplink grant from the network device, but skips using the first uplink grant to perform uplink transmission. The network device fails to receive uplink data sent by the terminal, and therefore, the network device considers that transmission on the first uplink grant fails, and further sends the second uplink grant to the terminal. The second uplink grant is a grant for retransmission and generated due to the failure of transmission on the first uplink grant. After receiving the second uplink grant, the terminal ignores the second uplink grant, or transmits the second data packet to the network device based on the second uplink grant.

After receiving the first uplink grant, the terminal may fail to decode the first uplink grant, and a physical layer cannot deliver the received first uplink grant to a HARQ entity. Alternatively, the terminal may not have to-be-sent data at this moment, so the terminal skips this uplink transmission. Alternatively, due to another reason, the terminal does not use the first uplink grant to perform uplink transmission. It will be appreciated that these scenarios are by way of example and not limitation.

Optionally, when the terminal receives the second uplink grant, because the terminal skips using the first uplink grant to perform uplink transmission, the terminal ignores the second uplink grant for retransmission, thereby reducing outdated information sent by the terminal to the network device.

Optionally, when the terminal receives the second uplink grant, because the terminal skips using the first uplink grant to perform uplink transmission, the terminal may consider the second uplink grant for retransmission as a second uplink grant for initial transmission, and sends the second data packet to the network device.

The first uplink grant and the second uplink grant may be dynamic uplink grants, or may be preconfigured uplink grants. This is not limited in this application.

According to the data transmission method in this embodiment of this application, the uplink grant is ignored, or the uplink grant for retransmission is considered as an uplink grant for initial transmission. This helps reduce outdated information sent by the terminal to the network device, thereby helping reduce improper scheduling decisions made by the network device.

Optionally, the ignoring the second uplink grant, or transmitting a second data packet to the network device based on the second uplink grant includes:

determining that a HARQ buffer is empty; and when the HARQ buffer is empty, ignoring the second uplink grant, or transmitting the second data packet to the network device based on the second uplink grant.

Specifically, when receiving the second uplink grant, the terminal first determines that the HARQ buffer is empty. After determining that the HARQ buffer is empty, the terminal ignores the second uplink grant, or transmits the second data packet to the network device based on the second uplink grant.

In an embodiment of this application, before determining that the HARQ buffer is empty, the terminal flushes the HARQ buffer. The flushing may be performed at any moment. For example, the flushing is performed after the first data packet is successfully sent. For another example, the flushing is performed when the terminal fails to use to the first uplink grant to transmit data. For still another example, the flushing is performed when the second uplink grant is received. For yet another example, the flushing is performed at any moment between a moment that the terminal fails to use the first uplink grant to transmit data and a moment that the second uplink grant is received. It will be appreciated that these scenarios are by way of example and not limitationplication.

Optionally, the transmitting a second data packet to the network device based on the second uplink grant includes:

initially transmitting the second data packet to the network device based on the second uplink grant.

Specifically, after receiving the second uplink grant, the terminal determines that the HARQ buffer is empty. A resource is indicated by the second uplink grant to the terminal for retransmission of data that is not successfully transmitted by using the first uplink grant (for example, the terminal could transmit a third data packet by using the first uplink grant, but actually, the third data packet is not transmitted). However, in this case, after determining that the HARQ buffer is empty, the terminal initially transmits the second data packet by using the second uplink grant.

Optionally, the terminal may alternatively not send the second data packet to the network device on an uplink resource corresponding to the second uplink grant when at least one of the following conditions may be met:

the terminal has no aperiodic channel state information of a physical uplink shared channel (PUSCH) to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

Figure 5:
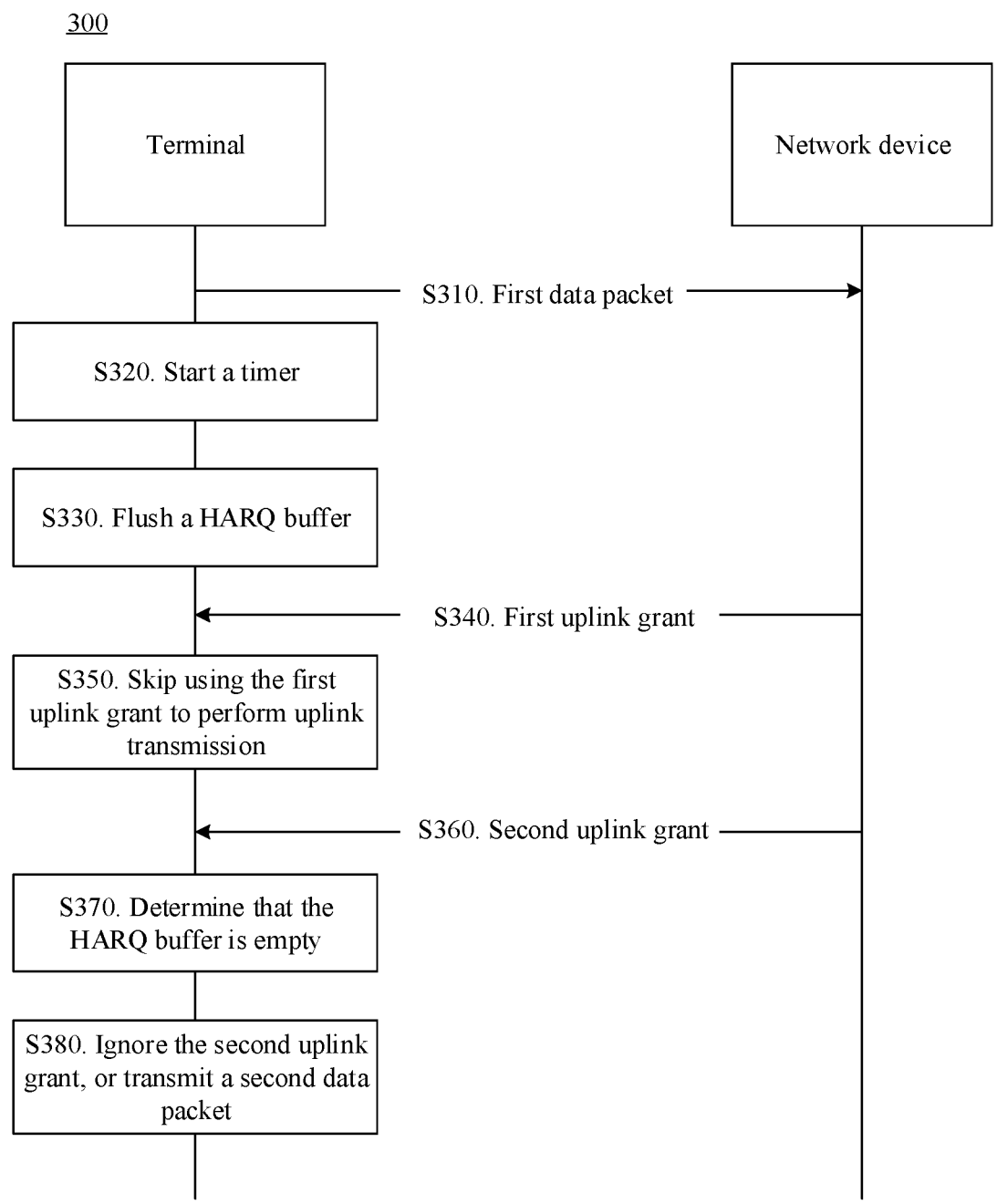
FIG. 5 is another schematic flowchart of a data transmission method according to an embodiment of this application.

FIG. 5 is a schematic flowchart of a data transmission method 300 according to an embodiment of this application. As shown in FIG. 5, the method 300 includes the following steps.

S310: Send a first data packet to a network device, and store the first data packet.

S320: Start a timer.

S330: Flush a HARQ buffer when the timer expires.

Specifically, after sending the first data packet to the network device and storing the first data packet in the HARQ buffer, the terminal starts the timer. When the timer expires, the terminal flushes the first data packet in the HARQ buffer.

Optionally, before the sending a first data packet to a network device, the method further includes:

receiving a third uplink grant from the network device, where the third uplink grant is used to transmit the first data packet.

The third uplink grant may be indicated to the terminal for retransmission or initial transmission of the first data packet.

If the third uplink grant is a dynamic uplink grant, a HARQ process is carried in the third uplink grant; or if the third uplink grant is a preconfigured uplink grant, a HARQ process is determined by the terminal based on a period and a quantity of HARQ processes that are configured in an RRC message.

Optionally, the third uplink grant is a dynamic uplink grant.

Optionally, the third uplink grant is a preconfigured uplink grant.

Optionally, the receiving a third uplink grant from the network device includes:

receiving radio resource control (RRC) signaling from the network device, where the RRC signaling includes the third uplink grant; or receiving radio resource control (RRC) signaling and downlink control information (DCI) from the network device, where the RRC signaling includes configuration information of the third uplink grant, and the DCI includes the third uplink grant.

Optionally, a sending moment of data on the HARQ process corresponding to the third uplink grant may be carried in the third uplink grant, so that the terminal sends the first data packet at the corresponding moment.

Optionally, the terminal may derive, based on parameters such as a preconfigured resource period and a quantity of HARQ processes that are allocated by the network device, the HARQ process corresponding to this transmission.

It should be understood that, the network device may add the parameters such as the allocated preconfigured resource period and quantity of HARQ processes to an RRC message, and send the RRC message to the terminal.

Optionally, during running of the timer, the terminal does not perform initial transmission on the HARQ process.

Optionally, the terminal waits for a feedback from the network device, to prevent the terminal from performing initial transmission on the HARQ process before receiving a feedback from the network device. To be specific, in this case, the first data packet is overwritten by another data packet, and therefore the network device cannot perform retransmission scheduling on the first data packet.

It should be understood that in an embodiment of this application, the third uplink grant may be a preconfigured uplink grant, or may be a dynamic uplink grant.

Optionally, a HARQ entity of the terminal instructs, at a moment when the timer expires, to flush the HARQ buffer.

Optionally, the terminal flushes the HARQ buffer at a moment in several moments before or after the timer expires, and the several moments may be configured by the network device or predefined by a protocol.

Optionally, the terminal flushes the HARQ buffer at a moment before or after the timer expires, and the moment may be configured by the network device or predefined by a protocol.

S340: Receive a first uplink grant from the network device.

S350: Skip using the first uplink grant to perform uplink transmission.

It should be understood that the terminal does not perform uplink transmission by using the first uplink grant. In other words, the terminal does not send a data packet to the network device on an uplink resource corresponding to the first uplink grant.

Optionally, the terminal does not send a data packet to the network device on the uplink resource corresponding to the first uplink grant when at least one of the following conditions may be met:

the terminal has no aperiodic channel state information of a PUSCH to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

S360: Receive a second uplink grant from the network device, where the second uplink grant is a grant for retransmission and generated due to a failure of transmission on the first uplink grant.

Optionally, the first uplink grant and the second uplink grant correspond to a same HARQ process.

S370: Determine that the HARQ buffer is empty.

S380: Ignore the second uplink grant, or transmit a second data packet to the network device based on the second uplink grant.

Optionally, the terminal may alternatively not send the second data packet to the network device on an uplink resource corresponding to the second uplink grant when at least one of the following conditions may be met:

the terminal has no aperiodic channel state information of a PUSCH to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

Figure 6:
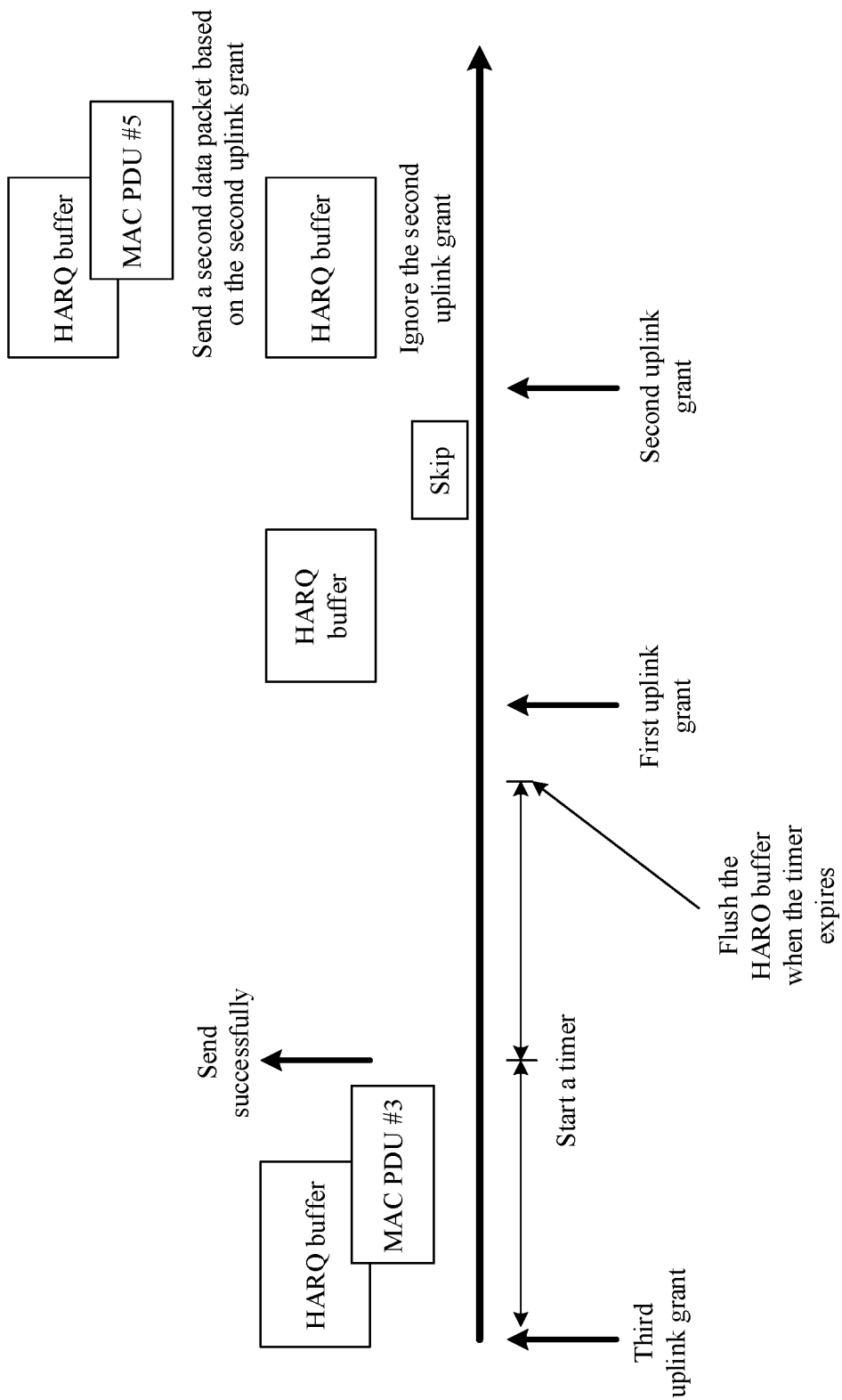
FIG. 6 is a schematic diagram of a data transmission process according to an embodiment of this application.

FIG. 6 is a schematic diagram of a data transmission process according to an embodiment of this application. As shown in FIG. 6, the terminal receives a third uplink grant that is indicated to the terminal for retransmission or initial transmission of a MAC PDU #3. After the terminal retransmits or initially transmits the MAC PDU #3 by using an HARQ process #3, the terminal stores the MAC PDU #3 in an HARQ Buffer #3 and starts a timer. When the timer expires, the terminal flushes the MAC PDU #3 in the HARQ Buffer #3. The terminal receives a first uplink grant, and the first uplink grant is indicated to the terminal for initial transmission, but the terminal skips using the first uplink grant to perform uplink transmission, and therefore, skips this transmission. The network device may incorrectly consider that the terminal sends a new data packet (for example, a MAC PDU #4) by using the first uplink grant and the new data packet is not successfully received by the network device. Therefore, the network device sends a second uplink grant to the terminal, the second uplink grant is indicated to the terminal for retransmission. After the terminal receives the second uplink grant, when determining that the HARQ Buffer #3 is empty, the terminal ignores the second uplink grant, or the terminal sends a new data packet (for example, a MAC PDU #5) based on the second uplink grant. According to the data transmission method in this embodiment of this application, the timer is started, and the buffer is flushed when the timer expires. This helps reduce outdated information sent by the terminal to the network device, thereby helping reduce improper scheduling decisions made by the network device.

Figure 7:
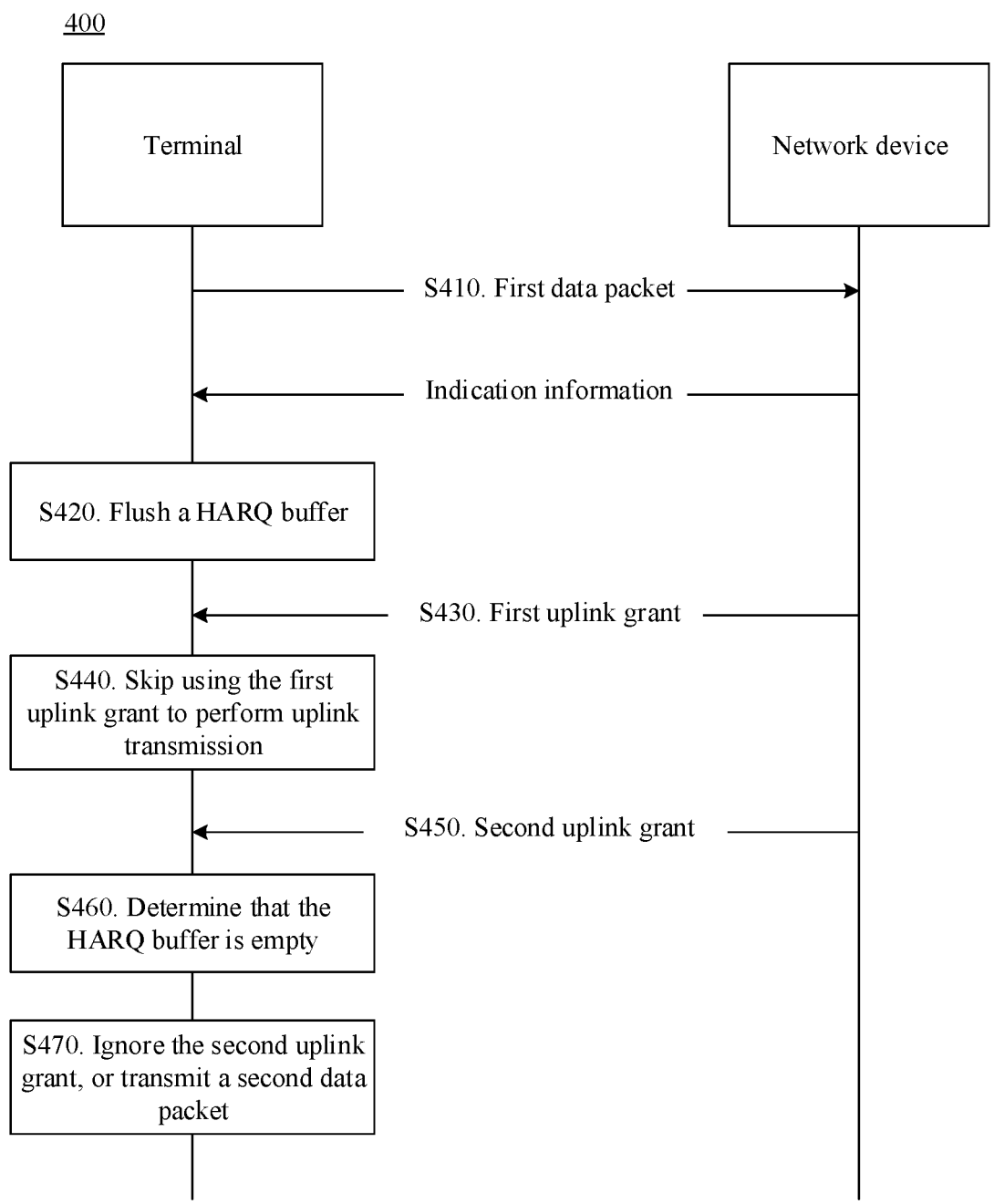
FIG. 7 is still another schematic flowchart of a data transmission method according to an embodiment of this application.
Figure 8:
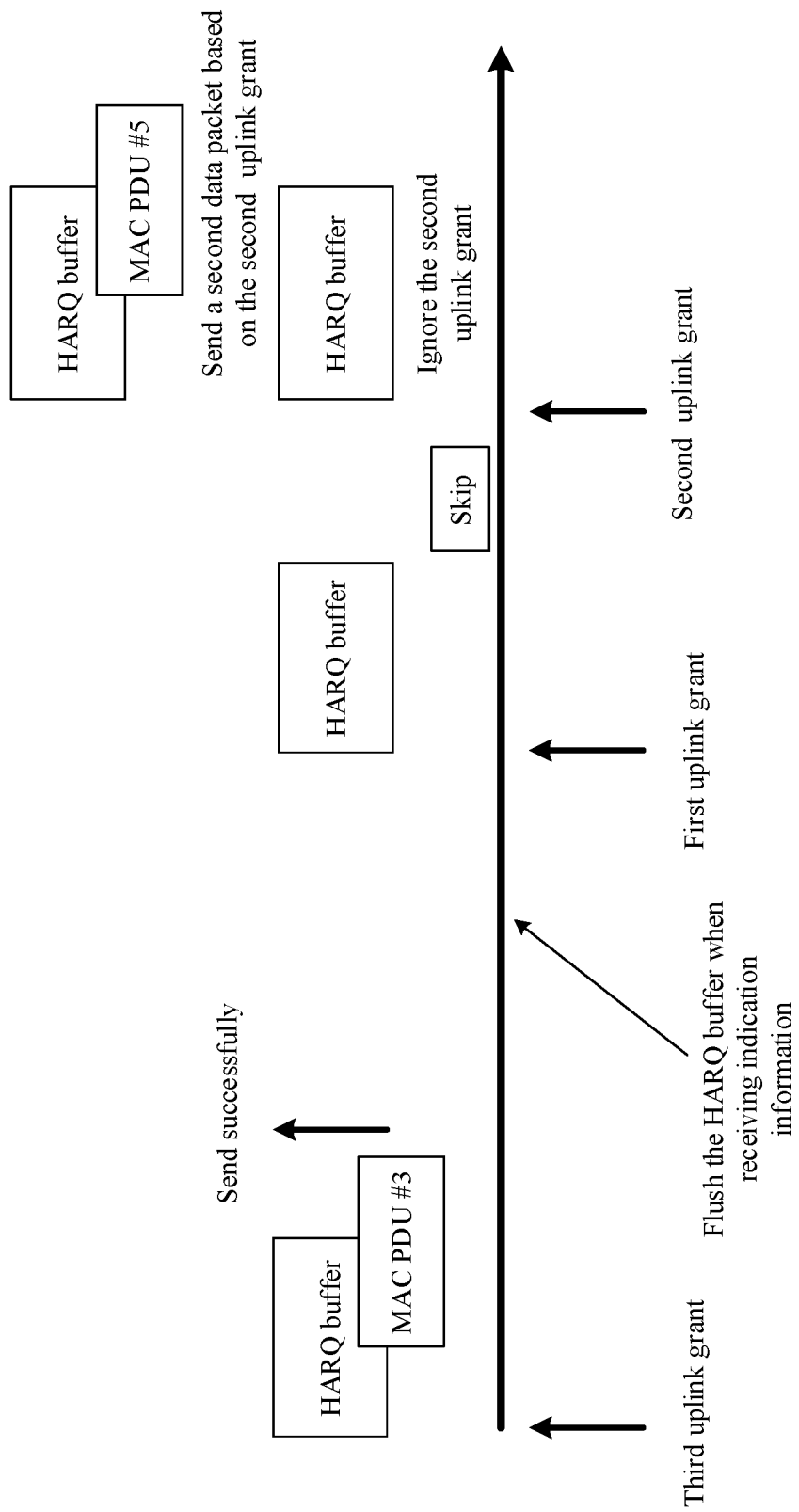
FIG. 8 is another schematic diagram of a data transmission process according to an embodiment of this application.

With reference to FIG. 5 and FIG. 6, the foregoing describes in detail that the HARQ buffer is flushed when the timer expires. With reference to FIG. 7 and FIG. 8, the following describes in detail a transmission method 400 in an embodiment of this application. In the method 400, a terminal flushes a HARQ buffer when receiving indication information indicating that a data packet is successfully received.

FIG. 7 is a schematic flowchart of the data transmission method 400 according to an embodiment of this application. As shown in FIG. 7, the method 400 includes the following steps.

S410: Send a first data packet to a network device, and store the first data packet.

S420: Flush a HARQ buffer when receiving indication information sent by the network device, where the indication information is used to indicate that the first data packet is successfully received.

Specifically, after the terminal sends the first data packet to the network device and stores the first data packet in the HARQ buffer, when the terminal receives the indication information sent by the network device, the terminal flushes the first data packet in the HARQ buffer, where the indication information is used to indicate that the first data packet is successfully received.

Optionally, the terminal flushes the HARQ buffer at a moment in several moments before or after the timer expires, and the several moments may be configured by the network device or predefined by a protocol.

Optionally, the terminal flushes the HARQ buffer at a moment before or after the timer expires, and the moment may be configured by the network device or predefined by a protocol.

It should be understood that, alternatively, the terminal may start the timer when sending the first data packet to the network device, and when receiving the indication information sent by the network device, the terminal stops the timer and flushes the first data packet in the HARQ buffer.

It should be further understood that in the method 300, when the timer expires, the terminal may consider that the first data packet is successfully transmitted, and flushes the first data packet in the HARQ buffer; in the method 400, the terminal flushes the HARQ buffer when receiving the indication information (ACK information) sent by the network device, where the ACK information is used to indicate that the first data packet is successfully transmitted. Alternatively, when receiving the indication information (ACK information) sent by the network device, the terminal stops the timer and flushes the HARQ buffer.

Optionally, the ACK information may be sent via a dedicated physical layer channel, or may be carried in special DCI. For example, the DCI carries only information about a HARQ process, to indicate that a data packet of the HARQ process is successfully sent. Alternatively, new field information may be added to the DCI, to indicate that the DCI carries an indication indicating that a data packet of the HARQ process is successfully sent.

Optionally, before the sending a first data packet to a network device, the method further includes:

receiving a third uplink grant from the network device, where the third uplink grant is used to transmit the first data packet.

The third uplink grant may be indicated to the terminal for retransmission or initial transmission of the first data packet.

Optionally, the third uplink grant is a dynamic uplink grant.

Optionally, the third uplink grant is a preconfigured uplink grant.

Optionally, the receiving a third uplink grant from the network device includes:

receiving radio resource control (RRC) signaling from the network device, where the RRC signaling includes the third uplink grant; or receiving radio resource control (RRC) signaling and downlink control information (DCI) from the network device, where the RRC signaling includes configuration information of the third uplink grant, and the DCI includes the third uplink grant.

Optionally, a sending moment of data of a HARQ process corresponding to the third uplink grant may be carried in the third uplink grant, so that the terminal sends the first data packet at the corresponding moment.

Optionally, the terminal may derive, based on parameters such as a preconfigured resource period and a quantity of HARQ processes that are allocated by the network device, the HARQ process corresponding to this transmission.

S430: Receive a first uplink grant from the network device.

S440: Skip using the first uplink grant to perform uplink transmission.

It should be understood that the terminal does not perform uplink transmission by using the first uplink grant. In other words, the terminal does not send a data packet to the network device on an uplink resource corresponding to the first uplink grant.

Optionally, the terminal does not send a data packet to the network device on the uplink resource corresponding to the first uplink grant when at least one of the following conditions may be met:

the terminal has no aperiodic channel state information of a PUSCH to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

S450: Receive a second uplink grant from the network device, where the second uplink grant is a grant for retransmission and generated due to a failure of transmission on the first uplink grant.

Optionally, the first uplink grant and the second uplink grant correspond to a same HARQ process.

S460: Determine that the HARQ buffer is empty.

S470: Ignore the second uplink grant, or transmit a second data packet to the network device based on the second uplink grant.

Optionally, the terminal may alternatively not send the second data packet to the network device on an uplink resource corresponding to the second uplink grant when at least one of the following conditions may be met:

the terminal has no aperiodic channel state information of a PUSCH to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

FIG. 8 is a schematic diagram of a data transmission process according to an embodiment of this application. As shown in FIG. 8, the terminal receives a third uplink grant that is indicated to the terminal for retransmission or initial transmission of a MAC PDU #3. After the terminal retransmits or initially transmits the MAC PDU #3 by using an HARQ process #3, the terminal stores the MAC PDU #3 in an HARQ Buffer #3 (optionally, a timer is started at this moment). When the terminal receives ACK information (or the terminal stops the timer when receiving ACK information), the terminal flushes the MAC PDU #3 in the HARQ Buffer #3. The terminal receives a first uplink grant, and the first uplink grant is indicated to the terminal for initial transmission, but the terminal skips using the first uplink grant to perform uplink transmission, and therefore, skips this transmission. The network device may incorrectly consider that the terminal sends a new data packet (for example, a MAC PDU #4) by using the first uplink grant and the new data packet is not successfully received by the network device. Therefore, the network device sends a second uplink grant to the terminal, the second uplink grant is indicated to the terminal for retransmission. After the terminal receives the second uplink grant, when determining that the HARQ Buffer #3 is empty, the terminal ignores the second uplink grant, or the terminal sends a new data packet (for example, a MAC PDU #5) based on the second uplink grant.

According to the data transmission method in this embodiment of this application, the buffer is flushed when the indication information indicating that the data packet is successfully received is received. This helps reduce outdated information sent by the terminal to the network device, thereby helping reduce improper scheduling decisions made by the network device.

Figure 9:
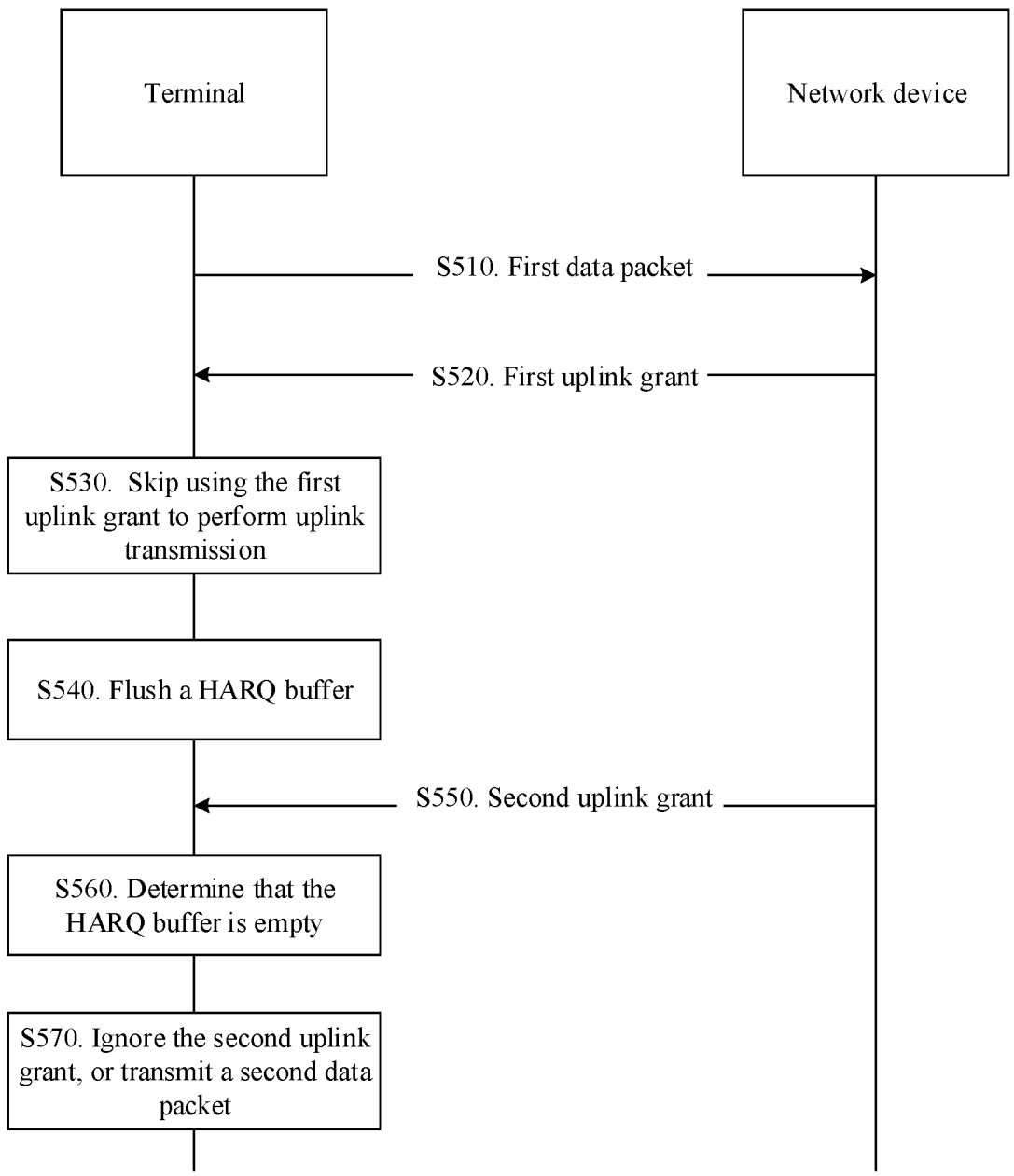
FIG. 9 is yet another schematic flowchart of a data transmission method according to an embodiment of this application.
Figure 10:
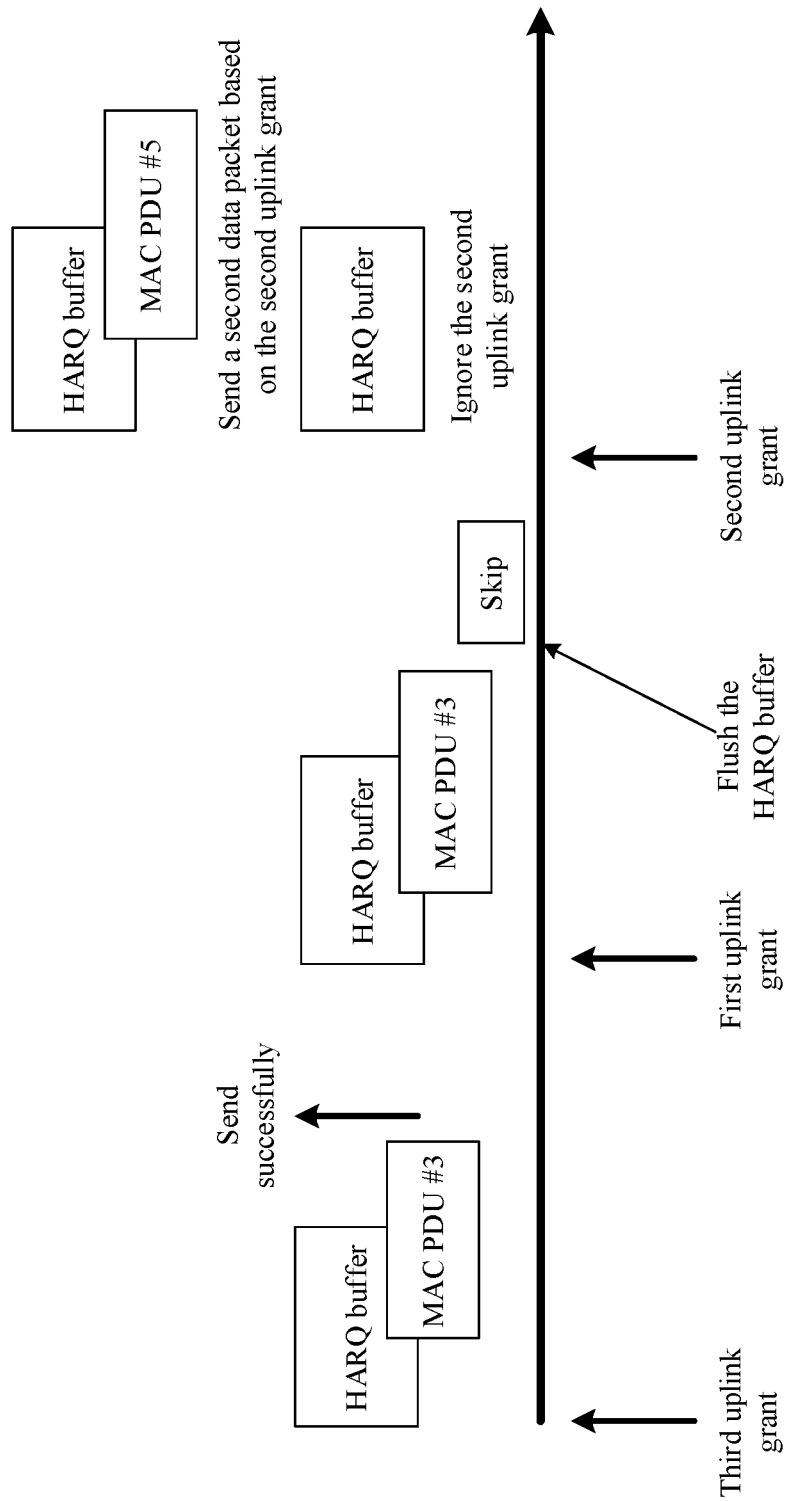
FIG. 10 is still another schematic diagram of a data transmission process according to an embodiment of this application.

With reference to FIG. 5 to FIG. 8, the foregoing describes in detail that the buffer is flushed when the timer expires or when the ACK information is received (or when the timer is stopped after the ACK information is received). With reference to FIG. 9 and FIG. 10, the following describes in detail a transmission method 500 in an embodiment of this application. In the method 500, a terminal flushes a buffer after the terminal skips using a first uplink grant to transmit uplink data.

FIG. 9 is a schematic flowchart of the data transmission method 500 according to an embodiment of this application. As shown in FIG. 9, the method 500 includes the following steps.

S510: Send a first data packet to a network device, and store the first data packet.

Optionally, before the sending a first data packet to a network device, the method further includes:

receiving a third uplink grant from the network device, where the third uplink grant is used to transmit the first data packet.

Optionally, the third uplink grant is a dynamic uplink grant.

Optionally, the third uplink grant is a preconfigured uplink grant.

Optionally, the third uplink grant is used for retransmission or initial transmission on a corresponding HARQ process.

Optionally, a sending moment of data of the HARQ process corresponding to the third uplink grant is carried in the third uplink grant, so that the terminal sends the first data packet at the corresponding moment.

S520: Receive a first uplink grant from the network device.

S530: Skip using the first uplink grant to perform uplink transmission.

Optionally, the first uplink grant is a dynamic uplink grant.

Optionally, the receiving a first uplink grant from the network device includes:

receiving downlink control information (DCI) from the network device, where the DCI includes the first uplink grant.

S540: Flush a HARQ buffer when determining that the first uplink grant is not used to perform uplink transmission.

Optionally, the first uplink grant is indicated to the terminal for initial transmission.

Optionally, a sending moment of data of a HARQ process corresponding to the first uplink grant may be carried in the first uplink grant, so that the terminal sends the data at the corresponding moment.

Specifically, when the terminal receives the first uplink grant, the first uplink grant is indicated to the terminal for initial transmission, but in this case, the terminal has no to-be-sent data. Therefore, after the terminal determines to skip using the first uplink grant to perform uplink transmission, the terminal flushes the HARQ buffer.

Optionally, the network device configures that the terminal can ignore the first uplink grant. This feature may be configured for the terminal via RRC signaling. After receiving the configuration, the terminal may ignore the first uplink grant when there is no data to be sent; or if the terminal does not receive the configuration, the terminal may send padding bits, namely, useless information, to the network device.

It should be understood that the terminal does not use the first uplink grant to perform uplink transmission. In other words, the terminal does not send a data packet to the network device on an uplink resource corresponding to the first uplink grant.

Optionally, the terminal does not send a data packet to the network device on the uplink resource corresponding to the first uplink grant when at least one of the following conditions may be met:

the terminal has no aperiodic channel state information of a PUSCH to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

S550: Receive a second uplink grant from the network device, where the second uplink grant is a grant for retransmission and generated due to a failure of transmission on the first uplink grant.

S560: Determine that the HARQ buffer is empty.

S570: Ignore the second uplink grant, or transmit a second data packet to the network device based on the second uplink grant.

Optionally, the terminal may alternatively not send the second data packet to the network device on an uplink resource corresponding to the second uplink grant when at least one of the following conditions may be met:

the terminal has no aperiodic channel state information of a PUSCH to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

FIG. 10 is another schematic diagram of a data transmission process according to an embodiment of this application. As shown in FIG. 10, the terminal receives a third uplink grant that is indicated to the terminal for retransmission or initial transmission of a MAC PDU #3. After the terminal retransmits or initially transmits the MAC PDU #3 by using a HARQ process #3, the terminal receives a first uplink grant, and the first uplink grant is indicated to the terminal for initial transmission, but the terminal may not use the first uplink grant, and therefore, skips this transmission. After the terminal determines not to use the first uplink grant to transmit uplink data, the terminal flushes the MAC PDU #3 in the HARQ Buffer #3. The network device may incorrectly consider that the terminal sends a new data packet (for example, a MAC PDU #4) by using the first uplink grant and the new data packet is not successfully received by the network device. Therefore, the network device sends a second uplink grant to the terminal, the second uplink grant is indicated to the terminal for retransmission. After the terminal receives the second uplink grant, when determining that the HARQ Buffer #3 is empty, the terminal ignores the second uplink grant, or the terminal sends a new data packet (for example, a MAC PDU #5) based on the second uplink grant.

According to the data transmission method in this embodiment of this application, the HARQ buffer is flushed when the uplink grant is not successfully used to transmit uplink data. This helps reduce outdated information sent by the terminal to the network device, thereby helping reduce improper scheduling decisions made by the network device.

Figure 11:
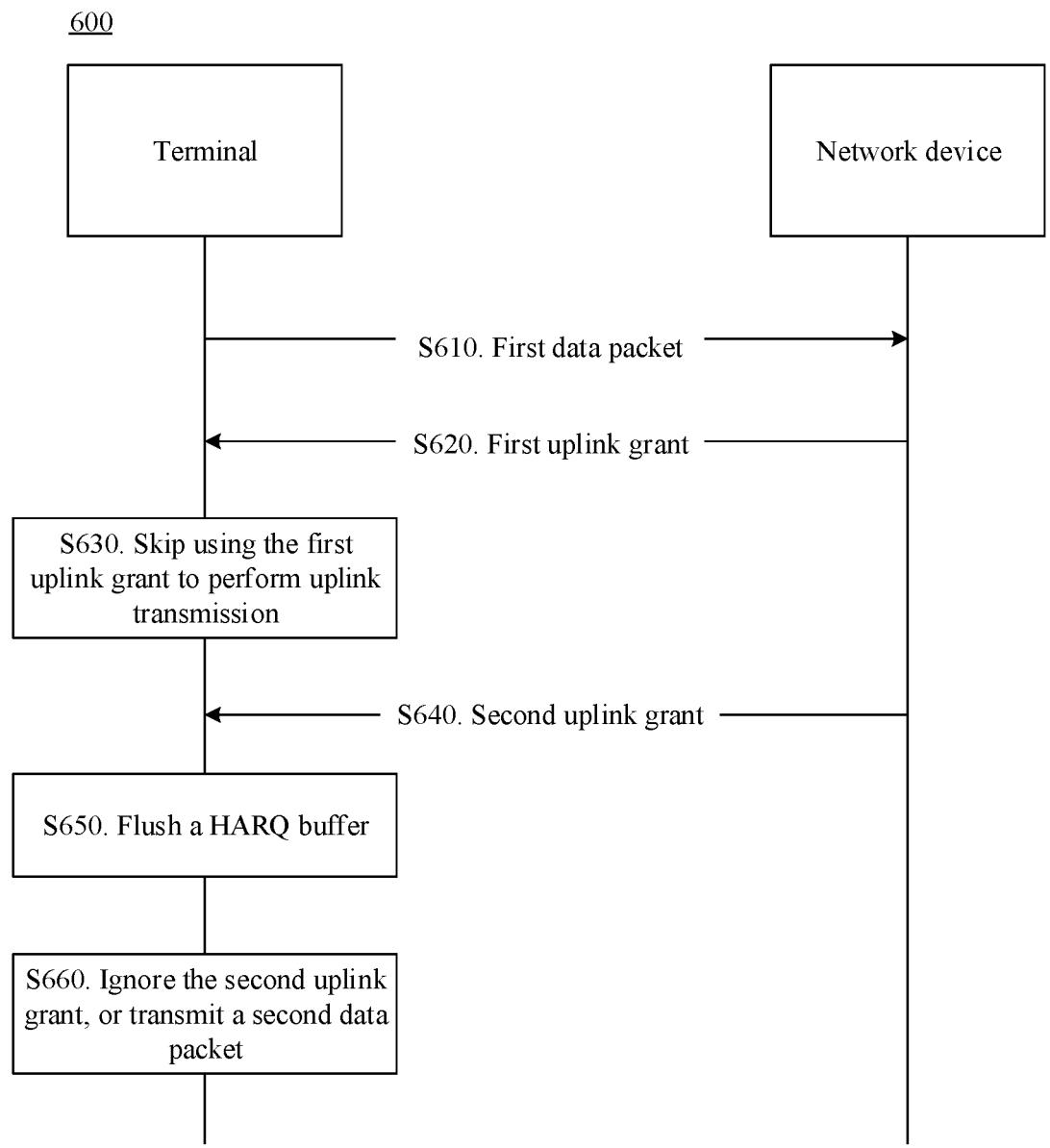
FIG. 11 is still yet another schematic flowchart of a data transmission method according to an embodiment of this application.
Figure 12:
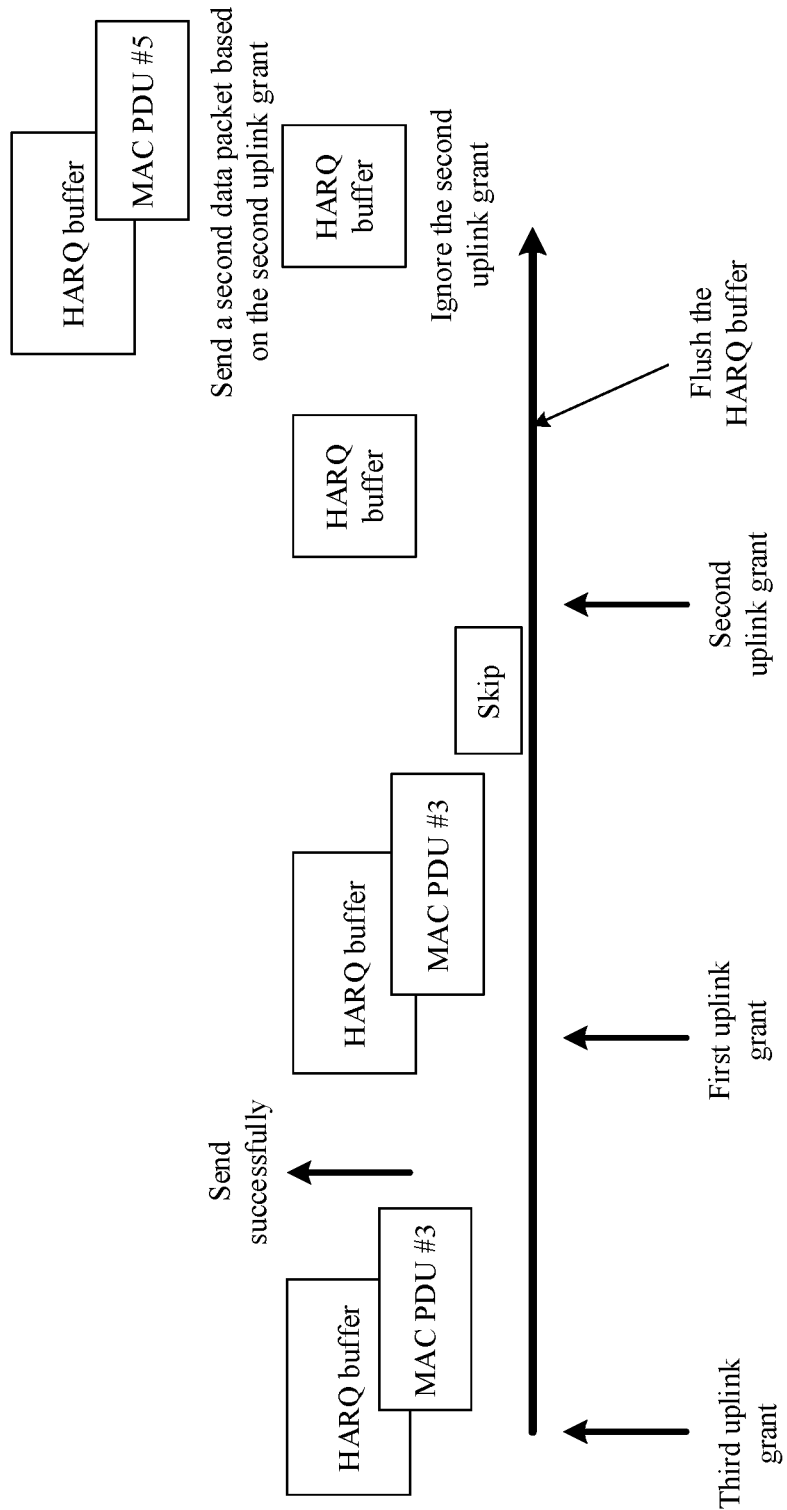
FIG. 12 is yet another schematic diagram of a data transmission process according to an embodiment of this application.

With reference to FIG. 9 to FIG. 10, the foregoing describes in detail that the buffer is flushed when the terminal fails to use the first uplink grant to transmit uplink data. With reference to FIG. 11 and FIG. 12, the following describes in detail a data transmission method 600 in an embodiment of this application. In the method 600, a terminal flushes a buffer after the terminal determines, after receiving a second uplink grant, that the terminal does not send data in last transmission.

FIG. 11 is a schematic flowchart of the transmission method 600 according to an embodiment of this application. As shown in FIG. 11, the method 600 includes the following steps.

S610: Send a first data packet to a network device, and store the first data packet.

Optionally, before the sending a first data packet to a network device, the method further includes:

receiving a third uplink grant from the network device, where the third uplink grant is used to transmit the first data packet.

Optionally, the third uplink grant is a dynamic uplink grant.

Optionally, the third uplink grant is a preconfigured uplink grant.

Optionally, the third uplink grant is used for retransmission or initial transmission on a corresponding HARQ process.

Optionally, a sending moment of data of the HARQ process corresponding to the third uplink grant is carried in the third uplink grant, so that the terminal sends the first data packet at the corresponding moment.

S620: Receive a first uplink grant from the network device.

S630: Skip using the first uplink grant to perform uplink transmission.

Specifically, the terminal may not have to-be-sent data after receiving the first uplink grant, and the terminal ignores the first uplink grant.

Optionally, the first uplink grant is a dynamic uplink grant.

Optionally, the first uplink grant is a preconfigured uplink grant.

Optionally, the first uplink grant is used for initial transmission on a corresponding HARQ process.

Optionally, a sending moment of data of the HARQ process corresponding to the first uplink grant is carried in the third uplink grant, so that the terminal sends the first data packet at the corresponding moment.

Optionally, the network device configures that the terminal can ignore the first uplink grant. This feature may be configured for the terminal via RRC signaling. After receiving the configuration, the terminal may ignore the first uplink grant when there is no data to be sent; or if the terminal does not receive the configuration, the terminal may send padding bits, namely, useless information, to the network device.

It should be understood that the terminal does not use the first uplink grant to perform uplink transmission. In other words, the terminal does not send a data packet to the network device on an uplink resource corresponding to the first uplink grant.

Optionally, the terminal does not send a data packet to the network device on the uplink resource corresponding to the first uplink grant when at least one of the following conditions may be met:

the terminal has no aperiodic channel state information of a PUSCH to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

S640: Receive a second uplink grant from the network device, where the second uplink grant is a grant for retransmission and generated due to a failure of transmission on the first uplink grant.

S650: Flush the HARQ buffer when it is determined that the first uplink grant is not used to perform uplink transmission.

Specifically, the terminal receives the second uplink grant sent by the network device, and the second uplink grant is used for retransmission on a HARQ process corresponding to the second uplink grant. After the terminal determines that in last transmission, the terminal skips using the first uplink grant to perform uplink transmission, the terminal flushes a data packet in the HARQ buffer.

Optionally, the first uplink grant and the second uplink grant correspond to a same HARQ process.

S660: Ignore the second uplink grant, or transmit a second data packet to the network device based on the second uplink grant.

Optionally, the terminal may alternatively not send the second data packet to the network device on an uplink resource corresponding to the second uplink grant when at least one of the following conditions may be met:

the terminal has no aperiodic channel state information of a PUSCH to be sent;

a data packet sent by the terminal to the network device does not include data information (for example, a MAC SDU); and a data packet sent by the terminal to the network device includes only a periodic data buffering report and does not include to-be-sent data; or the data packet includes only a padding data buffering report.

FIG. 12 is still another schematic diagram of a data transmission process according to an embodiment of this application. As shown in FIG. 12, the terminal receives a third uplink grant that is indicated to the terminal for retransmission or initial transmission of a MAC PDU #3. After the terminal retransmits or initially transmits the MAC PDU #3 by using a HARQ process #3, the terminal receives a first uplink grant, and the first uplink grant is indicated to the terminal for new transmission, but the terminal may not use the first uplink grant, and therefore, skips this transmission. The network device may incorrectly consider that the terminal sends a new data packet (for example, a MAC PDU #4) by using the first uplink grant and the new data packet is not successfully received by the network device. Therefore, the network device sends a second uplink grant to the terminal, the second uplink grant is indicated to the terminal for retransmission. After receiving the second uplink grant, the terminal flushes the MAC PDU #3 in the HARQ Buffer #3 after determining that the terminal fails to use the first uplink grant to transmit uplink data. After determining that the HARQ Buffer #3 is empty, the terminal ignores the second uplink grant, or the terminal sends a new data packet (for example, a MAC PDU #5) based on the second uplink grant.

According to the data transmission method in this embodiment of this application, the terminal flushes the HARQ buffer when the terminal determines, after receiving the uplink grant for retransmission, that the terminal fails to use the uplink grant to transmit uplink data in last transmission. This helps reduce outdated information sent by the terminal to the network device, thereby helping reduce improper scheduling decisions made by the network device.

The foregoing describes the data transmission method provided in the embodiments of this application in detail with reference to FIG. 4 to FIG. 12. The following describes a data transmission apparatus provided in the embodiments of this application in detail with reference to the accompanying drawings.

An embodiment of this application further provides an apparatus configured to implement any one of the foregoing methods. For example, an apparatus is provided. The apparatus is configured to implement each step performed by the terminal in any one of the foregoing methods. For another example, another apparatus is provided. The apparatus is configured to implement each step performed by the network device in any one of the foregoing methods.

Figure 13:
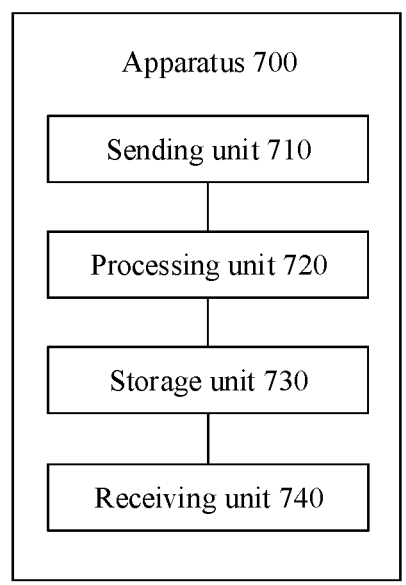
FIG. 13 is a schematic block diagram of a data transmission apparatus according to an embodiment of this application.

FIG. 13 is a schematic block diagram of a data transmission apparatus 700 according to an embodiment of this application. As shown in FIG. 13, the data transmission apparatus 700 may include a sending unit 710, a processing unit 720, a storage unit 730, and a receiving unit 740.

In a possible design, the data transmission apparatus may be the terminal in the foregoing method 200 to method 600, or a chip configured in the terminal.

Specifically, the sending unit 710 is configured to send a first data packet to a network device.

The processing unit 720 controls the storage unit 730 to store the first data packet.

The receiving unit 740 is configured to receive a first uplink grant from the network device.

The processing unit 720 skips using the first uplink grant to perform uplink transmission.

The receiving unit 740 is further configured to receive a second uplink grant from the network device, where the second uplink grant is a grant for retransmission and generated due to a failure of transmission on the first uplink grant.

The processing unit 720 is further configured to ignore the second uplink grant, or control the sending unit 710 to transmit a second data packet to the network device based on the second uplink grant.

Optionally, the first uplink grant and the second uplink grant correspond to a same HARQ process.

Optionally, the processing unit 720 does not use the first uplink grant to perform uplink transmission. In other words, the processing unit 720 does not control the sending unit 710 to send a data packet to the network device on an uplink resource corresponding to the first uplink grant.

Optionally, the first uplink grant is a dynamic uplink grant, or the first uplink grant is a preconfigured uplink grant.

Optionally, the second uplink grant is a dynamic uplink grant, or the second uplink grant is a preconfigured uplink grant.

Optionally, the second uplink grant is scrambled with a radio network temporary identifier.

Optionally, the sending unit 710 does not send a data packet to the network device on the uplink resource corresponding to the first uplink grant when at least one of the following conditions may be met:

the apparatus has no aperiodic channel state information of a PUSCH to be sent;

a data packet sent by the apparatus to the network device does not include data information (for example, a MAC SDU); and a data packet sent by the apparatus to the network device includes only a periodic data buffering report and does not include to-be-sent data; or the data packet includes only a padding data buffering report.

Optionally, the sending unit 710 may alternatively not send the second data packet to the network device on an uplink resource corresponding to the second uplink grant when at least one of the following conditions may be met:

the apparatus has no aperiodic channel state information of a PUSCH to be sent;

a data packet sent by the apparatus to the network device does not include data information (for example, a MAC SDU); and a data packet sent by the apparatus to the network device includes only a periodic data buffering report and does not include to-be-sent data; or the data packet includes only a padding data buffering report.

It should be understood that the data transmission apparatus 700 may correspond to the terminal in the data transmission method 200 according to the embodiment of this application, and the data transmission apparatus 700 may include units configured to perform the method performed by the terminal in the data transmission method 200 in FIG. 4. In addition, the units in the data transmission apparatus 700 and the foregoing other operations and/or functions are used to implement corresponding procedures of the data transmission method 200 in FIG. 4. For a specific process in which the units perform the foregoing corresponding steps, refer to the foregoing description with reference to the method embodiment corresponding to FIG. 4. For brevity, details are not described herein again.

Optionally, the processing unit 720 is specifically configured to:

determine that a hybrid automatic repeat request (HARQ) buffer is empty; and when the HARQ buffer is empty, ignore the second uplink grant, or control the sending unit 710 to transmit the second data packet to the network device based on the second uplink grant.

Optionally, the processing unit 720 is further configured to:

start a timer when the first data packet is sent; and flush the HARQ buffer when the timer expires.

It should be understood that the data transmission apparatus 700 may correspond to the terminal in the data transmission method 300 according to the embodiment of this application, and the data transmission apparatus 700 may include units configured to perform the method performed by the terminal in the data transmission method 300 in FIG. 5. In addition, the units in the data transmission apparatus 700 and the foregoing other operations and/or functions are used to implement corresponding procedures of the data transmission method 300 in FIG. 5. For a specific process in which the units perform the foregoing corresponding steps, refer to the foregoing description with reference to the method embodiment corresponding to FIG. 5. For brevity, details are not described herein again.

Optionally, the processing unit 720 flushes the HARQ buffer at a moment in several moments before or after the timer expires, where the several moments are configured by the network device, or the several moments are predefined by a protocol.

Optionally, the processing unit 720 flushes the HARQ buffer at a moment before or after the timer expires, where the moment may be configured by the network device or predefined by a protocol.

Optionally, the processing unit 720 is further configured to flush the HARQ buffer when the receiving unit 740 receives indication information from the network device, where the indication information is used to indicate that the first data packet is successfully received.

Optionally, the processing unit 720 is further configured to: start a timer when determining that the sending unit 710 sends the first data packet; and when determining that the receiving unit 740 receives indication information from the network device, stop the timer and flush the HARQ buffer, where the indication information is used to indicate that the first data packet is successfully received.

It should be understood that the data transmission apparatus 700 may correspond to the terminal in the data transmission method 400 according to the embodiment of this application, and the data transmission apparatus 700 may include units configured to perform the method performed by the terminal in the data transmission method 400 in FIG. 7. In addition, the units in the data transmission apparatus 700 and the foregoing other operations and/or functions are used to implement corresponding procedures of the data transmission method 400 in FIG. 7. For a specific process in which the units perform the foregoing corresponding steps, refer to the foregoing description with reference to the method embodiment corresponding to FIG. 7. For brevity, details are not described herein again.

Optionally, the processing unit 720 is further configured to flush the HARQ buffer when determining that the sending unit 710 skips using the first uplink grant to perform uplink transmission.

It should be understood that the data transmission apparatus 700 may correspond to the terminal in the data transmission method 500 according to the embodiment of this application, and the data transmission apparatus 700 may include units configured to perform the method performed by the terminal in the data transmission method 500 in FIG. 9. In addition, the units in the data transmission apparatus 700 and the foregoing other operations and/or functions are used to implement corresponding procedures of the data transmission method 500 in FIG. 9. For a specific process in which the units perform the foregoing corresponding steps, refer to the foregoing description with reference to the method embodiment corresponding to FIG. 9. For brevity, details are not described herein again.

Optionally, the processing unit 720 is further configured to: after determining that the receiving unit 740 receives the second uplink grant from the network device, determine that the first uplink grant is not used to perform uplink transmission; and flush the HARQ buffer.

It should be understood that the data transmission apparatus 700 may correspond to the terminal in the data transmission method 600 according to the embodiment of this application, and the data transmission apparatus 700 may include units configured to perform the method performed by the terminal in the data transmission method 600 in FIG. 11. In addition, the units in the data transmission apparatus 700 and the foregoing other operations and/or functions are used to implement corresponding procedures of the data transmission method 600 in FIG. 11. For a specific process in which the units perform the foregoing corresponding steps, refer to the foregoing description with reference to the method embodiment corresponding to FIG. 11. For brevity, details are not described herein again.

Optionally, the receiving unit 740 is further configured to receive a third uplink grant from the network device, where the third uplink grant is used to transmit the first data packet.

Optionally, the third uplink grant is a dynamic uplink grant, or the third uplink grant is a preconfigured uplink grant.

Optionally, the third uplink grant is a preconfigured uplink grant.

Optionally, the receiving unit 740 is specifically configured to:

receive radio resource control (RRC) signaling from the network device, where the RRC signaling includes the third uplink grant; or receive radio resource control (RRC) signaling and downlink control information (DCI) from the network device, where the RRC signaling includes configuration information of the third uplink grant, and the DCI includes the third uplink grant.

Optionally, the receiving unit 740 is specifically configured to:

receive downlink control information (DCI) from the network device, where the DCI includes the first uplink grant.

Optionally, the processing unit 720 is specifically configured to:

control the sending unit 710 to initially transmit the second data packet to the network device based on the second uplink grant.

It should be further understood that the foregoing unit division of the apparatus is merely logical function division, and in an actual implementation, all or some of the units may be integrated into one physical entity, or may be physically separated. In addition, all of the units in the apparatus may be implemented in a form of software invoked by a processing element, or may be implemented in a form of hardware; or some of the units may be implemented in a form of software invoked by a processing element, and some of the units may be implemented in a form of hardware. For example, each unit may be a separately disposed processing element, or may be integrated into a chip in the apparatus. In addition, each unit may be stored as a program in a memory and invoked by a processing element of the apparatus to perform a function of the unit. In addition, all or some of the units may be integrated together or may be separately implemented. The processing element herein may be alternatively a processor, and may be an integrated circuit having a signal processing capability. In an implementation process, the steps in the foregoing methods or the foregoing units may be implemented by using an integrated logic circuit of hardware in the processing element, or implemented in a form of software invoked by the processing element.

For example, the units in any foregoing apparatus may be one or more integrated circuits configured to implement the foregoing method, for example, one or more application-specific integrated circuits (ASIC), or one or more microprocessors (digital signal processor, DSP), or one or more field programmable gate arrays (FPGA), or a combination of at least two of these integrated circuits. For another example, when the unit in the apparatus may be implemented in a form of a program invoked by a processing element, the processing element may be a general-purpose processor, for example, a central processing unit (CPU) or another processor that can invoke the program. For another example, these units may be integrated together and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit used by the chip to receive a signal from another chip or apparatus. The foregoing sending unit is an interface circuit of the apparatus, and is configured to send a signal to another apparatus. For example, when the apparatus is implemented in a form of a chip, the sending unit is an interface circuit used by the chip to send a signal to another chip or apparatus.

Figure 14:
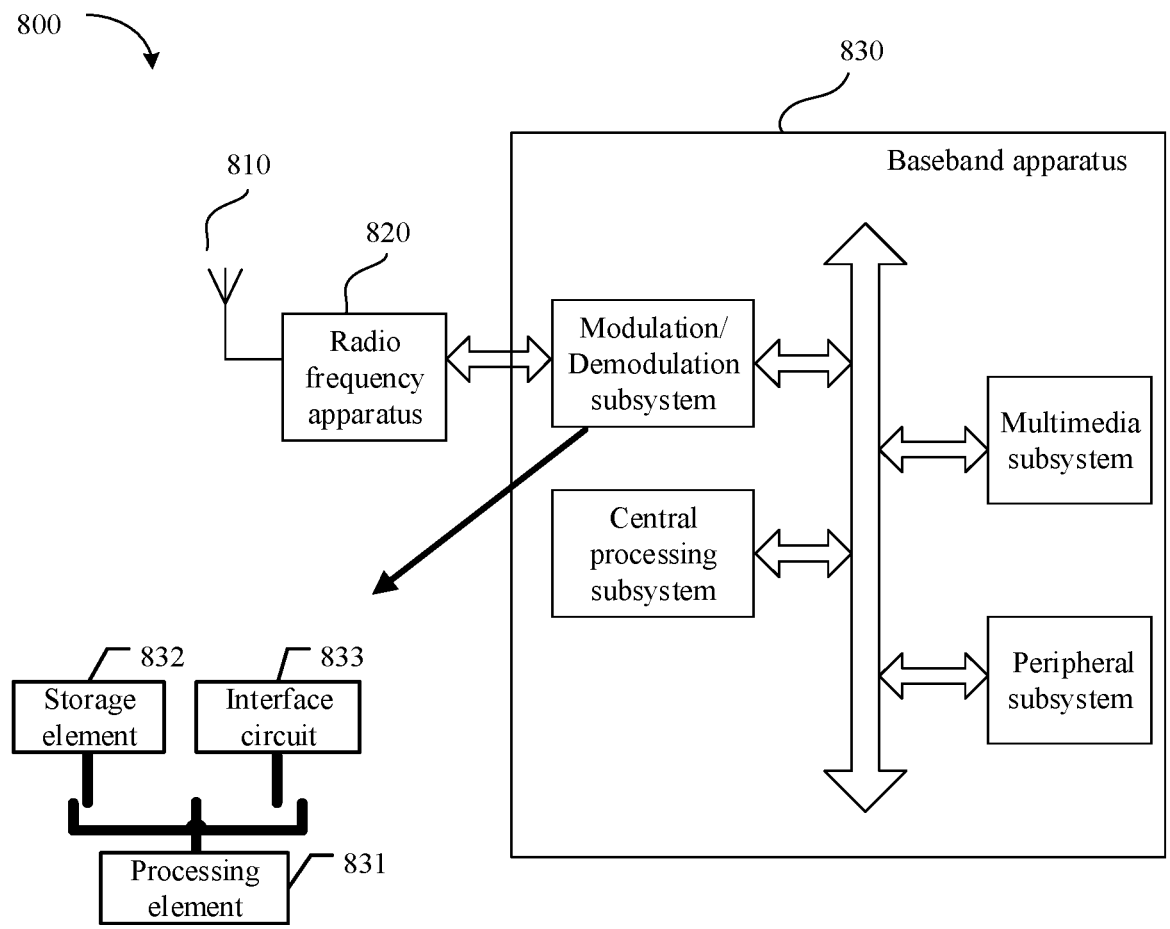
FIG. 14 is a schematic structural diagram of a terminal according to an embodiment of this application.

FIG. 14 is a schematic structural diagram of a terminal 800 according to an embodiment of this application. The terminal 800 may be the terminal in the foregoing embodiments, and may be configured to implement operations of the terminal in the foregoing embodiments. As shown in FIG. 14, the terminal 800 may include: an antenna 810, a radio frequency part 820, and a signal processing part 830. The antenna 810 is connected to the radio frequency part 820. In a downlink direction, the radio frequency part 820 receives, via the antenna 810, information sent by a network device, and sends the information sent by the network device, to the signal processing part 830 for processing. In an uplink direction, the signal processing part 830 processes information of the terminal and sends the processed information to the radio frequency part 820, and the radio frequency part 820 processes the information of the terminal and then sends the processed information to the network device by using the antenna 810.

The signal processing part 830 may include a modulation/demodulation subsystem, configured to implement data processing in each communications protocol layer. The signal processing part 830 may further include a central processing subsystem, configured to implement processing of an application layer and an operating system of the terminal. In addition, the signal processing part 830 may further include other subsystems, for example, a multimedia subsystem and a peripheral subsystem. The multimedia subsystem is configured to control a camera, screen display, or the like of the terminal, and the peripheral subsystem is configured to implement connections to another device. The modulation/demodulation subsystem may be a chip that is separately disposed. Optionally, the foregoing apparatus applied to the terminal may be located in the modulation/demodulation subsystem.

The modulation/demodulation subsystem may include one or more processing elements 831, for example, include a main control CPU and another integrated circuit. In addition, the modulation/demodulation subsystem may further include a storage element 832 and an interface circuit 833. The storage element 832 is configured to store data and a program. However, a program used to perform the method performed by the terminal in the foregoing method may not be stored in the storage element 832, but is stored in a memory outside the modulation/demodulation subsystem, and when being used, is loaded and used by the modulation/demodulation subsystem. The interface circuit 833 is configured to communicate with another subsystem. The foregoing apparatus applied to the terminal may be located in the modulation/demodulation subsystem. The modulation/demodulation subsystem may be implemented by using a chip. The chip includes at least one processing element and an interface circuit. The processing element is configured to perform each step of any method performed by the foregoing terminal, and the interface circuit is configured to communicate with another apparatus.

In an implementation, a unit, of the terminal, configured to perform each step in the foregoing method may be implemented in a form of a program invoked by a processing element. For example, the apparatus applied to the terminal includes a processing element and a storage element. The processing element invokes a program stored in the storage element, to perform the method performed by the terminal in the foregoing method embodiments. The storage element may be a storage element located on a same chip as the processing element, namely, an on-chip storage element.

In another implementation, a program used to perform the method performed by the terminal in the foregoing method may be in a storage element located on a different chip from the processing element, namely, an off-chip storage element. In this case, the processing element invokes or loads the program from the off-chip storage element onto the on-chip storage element, to invoke and perform the method performed by the terminal in the foregoing method embodiments.

In another implementation, the units, of the terminal, configured to implement the steps in the foregoing method may be configured as one or more processing elements, and these processing elements are disposed on the modulation/demodulation subsystem. The processing element herein may be an integrated circuit, for example, one or more application-specific integrated circuits (ASIC), or one or more digital signal processors (digital signal processor, DSP), or one or more field programmable gate arrays (FPGA), or a combination of these integrated circuits. These integrated circuits may be integrated together to form a chip.

The units, of the terminal, configured to implement the steps in the foregoing method may be integrated together and implemented in a form of a system-on-a-chip (SOC). The SOC chip is configured to implement the foregoing method. At least one processing element and a storage element may be integrated in the chip, and the processing element invokes a program stored in the storage element to implement the foregoing method performed by the terminal. Alternatively, at least one integrated circuit may be integrated in the chip, to implement the foregoing method performed by the terminal. Alternatively, the foregoing implementations may be combined, where functions of some units are implemented in a form of a program invoked by the processing element, and functions of some units are implemented in a form of an integrated circuit.

It will be appreciated that the foregoing apparatus applied to the terminal may include at least one processing element and an interface circuit. The at least one processing element is configured to perform any method that is performed by the terminal and that is provided in the foregoing method embodiments. The processing element may perform, in a first manner, to be specific, in the manner of invoking a program stored in the storage element, some or all steps performed by the terminal. Alternatively, the processing element may perform, in a second manner, to be specific, in the manner of combining an instruction and an integrated logic circuit of hardware in the processor element, some or all steps performed by the terminal. Certainly, some or all steps performed by the terminal may be alternatively performed by combining the first manner and the second manner.

As with the processing element described above, the processing element herein may be a general-purpose processor, for example, a central processing unit (CPU), or may be one or more integrated circuits configured to implement the foregoing method, for example, one or more ASICs, one or more microprocessors (DSPs), one or more FPGAs, or a combination of at least two of these integrated circuits.

The storage element may be a memory, or may be a collective name of a plurality of storage elements.

According to the method provided in the embodiments of this application, this application further provides a computer program product, and the computer program product includes computer program code. When the computer program code is run on a computer, the computer is enabled to perform the method in the foregoing embodiments.

According to the method provided in the embodiments of this application, this application further provides a computer-readable medium, and the computer-readable medium stores program code. When the program code is run on a computer, the computer is enabled to perform the method in the foregoing embodiments.

According to the method provided in the embodiments of this application, this application further provides a system. The system includes the foregoing terminal.

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireless (for example, infrared, radio, and microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art will understand that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It will be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it will be understood that the disclosed system, apparatus, and method may be implemented in other manners. The described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, and are not intended to limit the protection scope of this application. Any variation or replacement readily figured out by a person skilled in the art within the technical scope disclosed in this application shall fall within the protection scope of this application.

What is claimed is:

1. A data transmission method performed by a terminal, the method comprising:
   receiving a third uplink grant from a network device, wherein the third uplink grant is used to send a first data packet, wherein the third uplink grant is a preconfigured uplink grant;
   sending the first data packet on a resource indicated by the third uplink grant to the network device;
   storing the first data packet in a hybrid automatic repeat request (HARQ) buffer;
   receiving a first uplink grant from the network device;
   skipping using the first uplink grant to perform uplink transmission;
   flushing the HARQ buffer in response to determining that the first uplink grant is not used to perform uplink transmission;
   wherein the terminal determines that the first uplink grant is not used to perform uplink transmission, based on at least one of the following (a) or (b):
      (a) the terminal has no aperiodic channel state information of a physical uplink shared channel (PUSCH) to be sent; or
      (b) a data packet sent by the terminal to the network device includes only a periodic data buffering report and does not include to-be-sent data; or the data packet includes only a padding data buffering report;
   receiving a second uplink grant from the network device, wherein the second uplink grant is a grant for retransmission; and
   transmitting a second data packet to the network device on a resource indicated by the second uplink grant.

2. The method according to claim 1, wherein transmitting the second data packet to the network device based on the second uplink grant comprises:
first determining that the HARQ buffer is empty.

3. The method according to claim 1, wherein the receiving the third uplink grant from the network device comprises:
receiving radio resource control (RRC) signaling from the network device, wherein the RRC signaling comprises the third uplink grant; or
receiving radio resource control (RRC) signaling and downlink control information (DCI) from the network device, wherein the RRC signaling comprises configuration information of the third uplink grant, and the DCI comprises the third uplink grant.

4. The method according to claim 1, wherein the receiving the first uplink grant from the network device comprises:
receiving downlink control information (DCI) from the network device, wherein the DCI comprises the first uplink grant.

5. The method according to claim 1, wherein the transmitting the second data packet to the network device on the resource indicated by the second uplink grant comprises:
initially transmitting the second data packet to the network device based on the resource indicated by the second uplink grant.

6. The method according to claim 1, wherein the second uplink grant is scrambled with a radio network temporary identifier (RNTI), and is indicated to the terminal for a retransmission.

7. The method according to claim 6, wherein the RNTI comprises a cell RNTI (C-RNTI), or a configured scheduling RNTI (CS-RNTI) used for preconfigured scheduling retransmission.

8. The method according to claim 1, wherein the second uplink grant is a grant for retransmission performed due to transmission on the first uplink grant not being received by the network device.

9. An apparatus, comprising at least one processor, configured to invoke a program stored in a memory, wherein the program, when executed by the processor, causes the apparatus to perform a method, the method comprising:
receiving a third uplink grant from a network device, wherein the third uplink grant is a preconfigured uplink grant and is used to send a first data packet;
sending the first data packet on a resource indicated by the third uplink grant to the network device;
storing the first data packet in a hybrid automatic repeat request (HARQ) buffer;
receiving a first uplink grant from the network device;
skipping using the first uplink grant to perform uplink transmission;
flushing the HARQ buffer in response to determining that the first uplink grant is not used to perform uplink transmission;
wherein the apparatus determines that the first uplink grant is not used to perform uplink transmission, based on at least one of the following (a) or (b):

(a) the apparatus has no aperiodic channel state information of a physical uplink shared channel (PUSCH) to be sent; or
(b) a data packet sent by the apparatus to the network device includes only a periodic data buffering report and does not include to-be-sent data; or the data packet includes only a padding data buffering report;
receiving a second uplink grant from the network device, wherein the second uplink grant is a grant for retransmission; and
transmitting a second data packet to the network device on a resource indicated by the second uplink grant.

10. The apparatus according to claim 9, wherein the program, when executed by the processor, causes the apparatus further to perform the method comprising:
in response to determining that the HARQ buffer is empty performing the at least one of (a) ignoring the second uplink grant, or (b) transmitting the second data packet to the network device based on the second uplink grant.

11. The apparatus according to claim 9, wherein the program, when executed by the processor, causes the apparatus further to perform the method comprising:
receiving radio resource control (RRC) signaling from the network device, wherein the RRC signaling comprises the third uplink grant; or
receiving radio resource control (RRC) signaling and downlink control information (DCI) from the network device, wherein the RRC signaling comprises configuration information of the third uplink grant, and the DCI comprises the third uplink grant.

12. The apparatus according to claim 9, wherein the program, when executed by the processor, causes the apparatus further to perform the method comprising:
receiving downlink control information (DCI) from the network device, wherein the DCI comprises the first uplink grant.

13. The apparatus according to claim 9, wherein the program, when executed by the processor, causes the apparatus further to perform the method comprising:
initially transmitting the second data packet to the network device based on the resource indicated by the second uplink grant.

14. The apparatus according to claim 9, wherein the second uplink grant is scrambled with a radio network temporary identifier (RNTI), and is indicated to the terminal for a retransmission.

15. The apparatus according to claim 14, wherein the RNTI comprises a cell RNTI (C-RNTI), or a configured scheduling RNTI (CS-RNTI) used for preconfigured scheduling retransmission.

16. The apparatus according to claim 9, wherein the second uplink grant is a grant for retransmission performed due to transmission on the first uplink grant is not received by the network device.

* * * * *